(12) United States Patent
Dembo

(10) Patent No.: US 8,483,506 B2
(45) Date of Patent: Jul. 9, 2013

(54) IMAGE PROCESSING SYSTEM AND METHOD OF IMAGE PROCESSING

(75) Inventor: Hiroki Dembo, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 845 days.

(21) Appl. No.: 12/489,479

(22) Filed: Jun. 23, 2009

(65) Prior Publication Data
US 2009/0324074 A1 Dec. 31, 2009

(30) Foreign Application Priority Data

Jun. 25, 2008 (JP) ................................. 2008-165758

(51) Int. Cl.
*G06K 9/40* (2006.01)
(52) U.S. Cl.
USPC ............................ 382/274; 348/672; 348/687
(58) Field of Classification Search
None
See application file for complete search history.

(56) References Cited

U.S. PATENT DOCUMENTS

| | | | |
|---|---|---|---|
| 4,409,134 A | 10/1983 | Yamazaki | |
| 6,148,103 A * | 11/2000 | Nenonen | 382/169 |
| 6,526,234 B1 * | 2/2003 | Malloy Desormeaux | 396/374 |
| 7,245,764 B2 * | 7/2007 | Nishizawa | 382/168 |
| 7,248,743 B2 | 7/2007 | Murakami | |
| 7,386,181 B2 | 6/2008 | Murakami | |
| 7,394,932 B2 | 7/2008 | Kida et al. | |
| 7,474,785 B2 * | 1/2009 | Wu et al. | 382/168 |
| 7,648,099 B2 | 1/2010 | Hwang et al. | |
| 7,865,014 B2 * | 1/2011 | Wu et al. | 382/168 |
| 8,059,875 B2 | 11/2011 | Uehara et al. | |
| 2004/0032982 A1 * | 2/2004 | Nishizawa | 382/171 |
| 2005/0031201 A1 * | 2/2005 | Goh | 382/169 |
| 2006/0018537 A1 * | 1/2006 | Wu et al. | 382/168 |
| 2006/0227064 A1 | 10/2006 | Tamano et al. | |
| 2006/0285025 A1 | 12/2006 | Yoshida et al. | |
| 2007/0103418 A1 | 5/2007 | Ogino et al. | |
| 2008/0074372 A1 | 3/2008 | Baba et al. | |
| 2008/0284859 A1 * | 11/2008 | Lee | 348/208.1 |

(Continued)

FOREIGN PATENT DOCUMENTS

| | | |
|---|---|---|
| EP | 1921629 A | 5/2008 |
| JP | 11-234583 A | 8/1999 |

(Continued)

*Primary Examiner* — Chan S Park
*Assistant Examiner* — Sean Motsinger
(74) *Attorney, Agent, or Firm* — Eric J. Robinson; Robinson Intellectual Property Law Office, P.C.

(57) ABSTRACT

To provide an image processing system for detecting an image a frame which causes large blinking of light among realistic images with a high dynamic range and for correcting the image and a method of image processing. The image processing system includes a histogram conversion portion for calculating a histogram in accordance with an image of an $n^{th}$ frame, an image of an $(n+1)^{th}$ frame, and image data which are stored in an image data storage portion; a histogram comparator portion for calculating a difference between the histogram of the $n^{th}$ frame and the histogram of the $(n+1)^{th}$ frame to form a histogram curve and for comparing the histogram curve with a threshold curve; an image correction circuit portion for performing correction for narrowing the dynamic range of the image data of the image of the $(n+1)^{th}$ frame, which is read from the image data storage portion; and an output switching switch portion for switching and outputting the image data corrected in the image correction circuit portion and the image data from the image data storage portion, which is not corrected, in accordance with output from the histogram comparator portion.

16 Claims, 20 Drawing Sheets

U.S. PATENT DOCUMENTS

| | | |
|---|---|---|
| 2009/0027572 A1 | 1/2009 | Kido et al. |
| 2009/0051814 A1* | 2/2009 | Shirane et al. ............... 348/571 |
| 2009/0324074 A1* | 12/2009 | Dembo .......................... 382/168 |
| 2011/0115980 A1* | 5/2011 | Shmueli et al. ............... 348/607 |

FOREIGN PATENT DOCUMENTS

| | | |
|---|---|---|
| JP | 11-275385 A | 10/1999 |
| JP | 2001-136463 A | 5/2001 |
| JP | 2002-101357 A | 4/2002 |
| JP | 2004-032207 A | 1/2004 |
| JP | 2004-120049 A | 4/2004 |
| JP | 2004-310475 A | 11/2004 |
| JP | 2005-217574 | 8/2005 |
| JP | 2008-124760 A | 5/2008 |
| WO | WO 2009/001735 | 12/2008 |

* cited by examiner

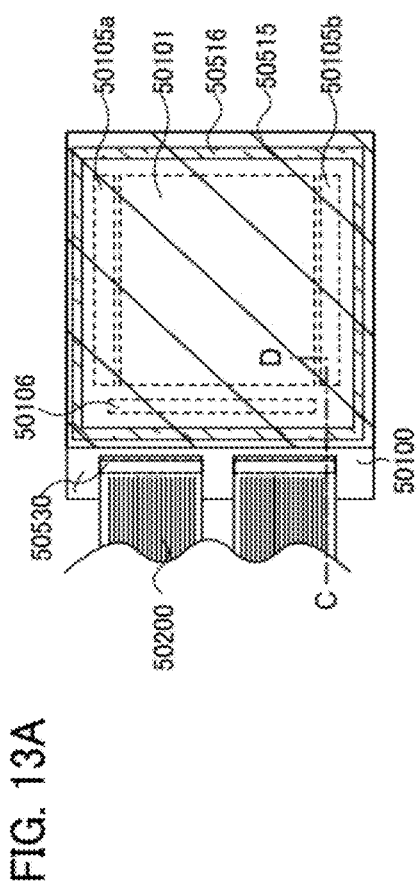
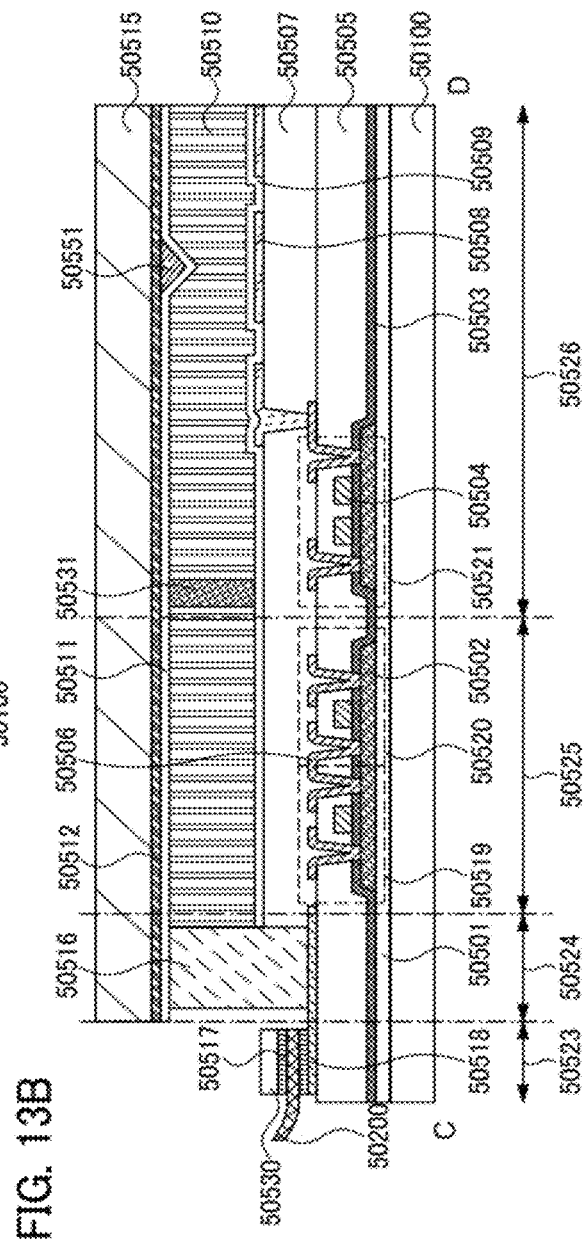
FIG. 13A
FIG. 13B

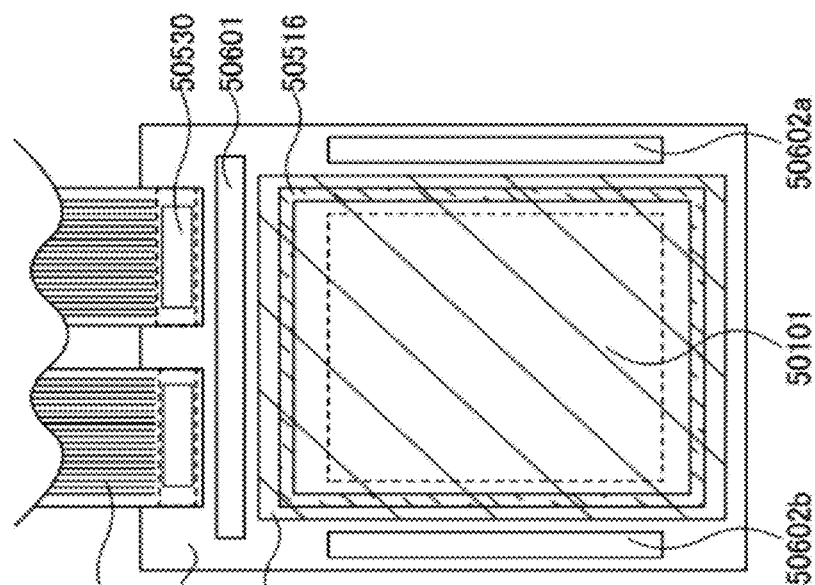
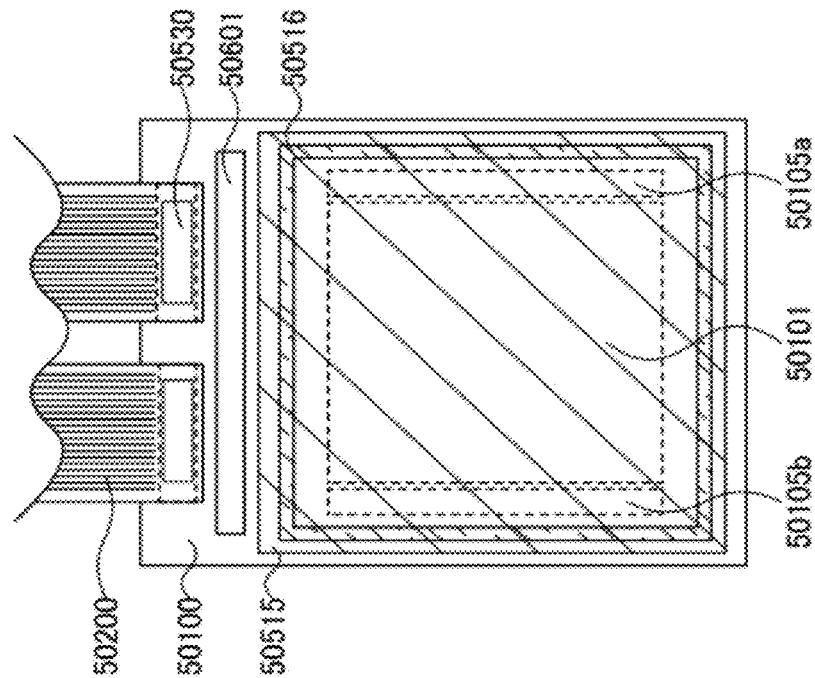

1

IMAGE PROCESSING SYSTEM AND METHOD OF IMAGE PROCESSING

BACKGROUND OF THE INVENTION

1. Field of the Invention

The present invention relates to image processing systems. In particular, the present invention relates to image processing systems for displaying moving images. Further, the present invention relates to a method for processing images. In particular, the present invention relates to a method for processing moving images.

2. Description of the Related Art

In display devices for displaying images by input of video signals for watching television broadcasts or the like from the outside, gamma correction should be performed on the video signals in order to display linear grayscale depending on the kind of display devices.

Further, the display devices display linear grayscale by gamma correction and compensate tone curves (also referred to as grayscale correction characteristics) showing relationships between input luminance signals (also referred to as input signals) and output luminance signals (also referred to as output signals) in order to improve image quality. Examples of grayscale correction which is performed together with gamma correction include correction in which relationships between input signals and output signals are S-shaped curves and correction in which the dynamic range of output signals is broadened or narrowed (for example, see Reference 1).

Reference 1: Japanese Published Patent Application No. 2005-217574

SUMMARY OF THE INVENTION

In recent years, in order to watch moving images having high image quality, display devices having higher contrast ratio (e.g., liquid crystal display devices or plasma display devices) have developed and widely spread. Thus, realistic moving images can be enjoyed with a high dynamic range.

However, there has been a case in which large blinking of light twenty to fifty times for one second induces photosensitive epilepsy in a child who watches moving images in a dark room for a long time. Thus, realistic moving images with a high dynamic range might be problematic.

Alternatively, light adaptation or dark adaptation with respect to large blinking of light in watching realistic moving images with a high dynamic range varies among different individuals. Therefore, even among people who watch the same content, some of them might feel eyestrain or unwellness.

On the other hand, an adverse effect of large blinking of light can be relieved by simply lowering the brightness of the entire screen. However, simple reduction in the brightness of the entire screen leads to impossibility of watching moving images having high image quality and significant reduction in visibility of moving images with dark portions.

In view of the foregoing problems, it is an object of an embodiment of the present invention to provide an image processing system and a method of image processing for detecting an image of a frame which causes large blinking of light among realistic moving images with a high dynamic range and for correcting the image.

An embodiment of the present invention is an image processing system which includes a display device for displaying moving images by using images divided into a plurality of frames; an image data storage portion for storing image data of an image of an $n^{th}$ (n is a natural number) frame and image data of an image of an $(n+1)^{th}$ frame; a histogram conversion portion for calculating a histogram of the $n^{th}$ frame and a histogram of the $(n+1)^{th}$ frame in accordance with the image data stored in the image data storage portion; a histogram comparator portion for calculating a difference between the histogram of the $n^{th}$ frame and the histogram of the $(n+1)^{th}$ frame to form a histogram curve and for comparing the histogram curve with a threshold curve; an image correction circuit portion for performing correction for narrowing the dynamic range of the image data of the image of the $(n^+)^{th}$ frame, which is read from the image data storage portion; and an output switching switch portion for switching and outputting the image data corrected in the image correction circuit portion and the image data from the image data storage portion, which is not corrected, in accordance with output from the histogram comparator portion.

An embodiment of the present invention is an image processing system which includes a display device for displaying moving images by using images divided into a plurality of frames; an image data storage portion for storing image data of an image of an $n^{th}$ (n is a natural number) frame and image data of an image of an $(n+1)^{th}$ frame; a histogram conversion portion for calculating a histogram of the $n^{th}$ frame and a histogram of the $(n+1)^{th}$ frame in accordance with the image data stored in the image data storage portion; an external illuminance detector for detecting illuminance; a histogram comparator portion for calculating a difference between the histogram of the $n^{th}$ frame and the histogram of the $(n+1)^{th}$ frame to form a histogram curve and for comparing the histogram curve with a threshold curve in accordance with output from the external illuminance detector; an image correction circuit portion for performing correction for narrowing the dynamic range of the image data of the image of the $(n+1)^{th}$ frame, which is read from the image data storage portion; and an output switching switch portion for switching and outputting the image data corrected in the image correction circuit portion and the image data from the image data storage portion, which is not corrected, in accordance with output from the histogram comparator portion.

An embodiment of the present invention is a method of image processing by dividing moving images into a plurality of frames which includes the following steps: storing image data of an image of an $n^{th}$ (n is a natural number) frame and image data of an image of an $(n+1)^{th}$ frame in an image data storage portion, calculating a histogram of the $n^{th}$ frame and a histogram of the $(n+1)^{th}$ frame in a histogram conversion portion in accordance with the image data stored in the image data storage portion, calculating a difference between the histogram of the $n^{th}$ frame and the histogram of the $(n+1)^{th}$ frame to form a histogram curve and comparing the histogram curve with a threshold curve in a histogram comparator portion, performing correction for narrowing the dynamic range of the image data of the image of the $(n+1)^{th}$ frame, which is read from the image data storage portion, in an image correction circuit portion, and switching and outputting the image data corrected in the image correction circuit portion and the image data from the image data storage portion, which is not corrected, in an output switching switch portion, in accordance with output from the histogram comparator portion.

An embodiment of the present invention is a method of image processing which by dividing moving images into a plurality of frames includes the following steps: storing image data of an image of an $n^{th}$ (n is a natural number) frame and image data of an image of an $(n+1)^{th}$ frame in an image data storage portion, calculating a histogram of the $n^{th}$ frame and a histogram of the $(n+1)^{th}$ frame in a histogram conversion portion in accordance with the image data stored in the image data storage portion, detecting illuminance in an external illuminance detector, calculating a difference between the histogram of the $n^{th}$ frame and the histogram of the $(n+1)^{th}$ frame to form a histogram curve and comparing the histogram curve with a threshold curve in accordance with output from the external illuminance detector in a histogram comparator portion, performing correction for narrowing the dynamic range of the image data of the image of the $(n+1)^{th}$ frame, which is read from the image data storage portion, in an image correction circuit portion, and switching and outputting the image data corrected in the image correction circuit portion and the image data from the image data storage portion, which is not corrected, in an output switching switch portion, in accordance with output from the histogram comparator portion.

According to an embodiment of the present invention, gamma correction for detecting an image of a frame which causes large blinking of light among realistic moving images with a high dynamic range so that the dynamic range is narrowed can be performed. Further, an image processing system and a method of image processing by which reduction in contrast ratio can be suppressed without reducing the quality of moving images can be provided.

BRIEF DESCRIPTION OF THE DRAWINGS

In the accompanying drawings:
FIGS. 13A and 13B illustrate Embodiment 3;
FIGS. 14A and 14B illustrate Embodiment 3.

DETAILED DESCRIPTION OF THE INVENTION

Hereinafter, the present invention will be described with reference to the drawings. Note that the present invention can be implemented in various different ways and it will be readily appreciated by those skilled in the art that various changes and modifications are possible without departing from the spirit and scope of the present invention. Therefore, the present invention should not be construed as being limited to the following description of embodiments.

Embodiment 1

In this embodiment, an image processing system which includes a display device for displaying moving images by using images divided into a plurality of frames is described.

Figure 1:
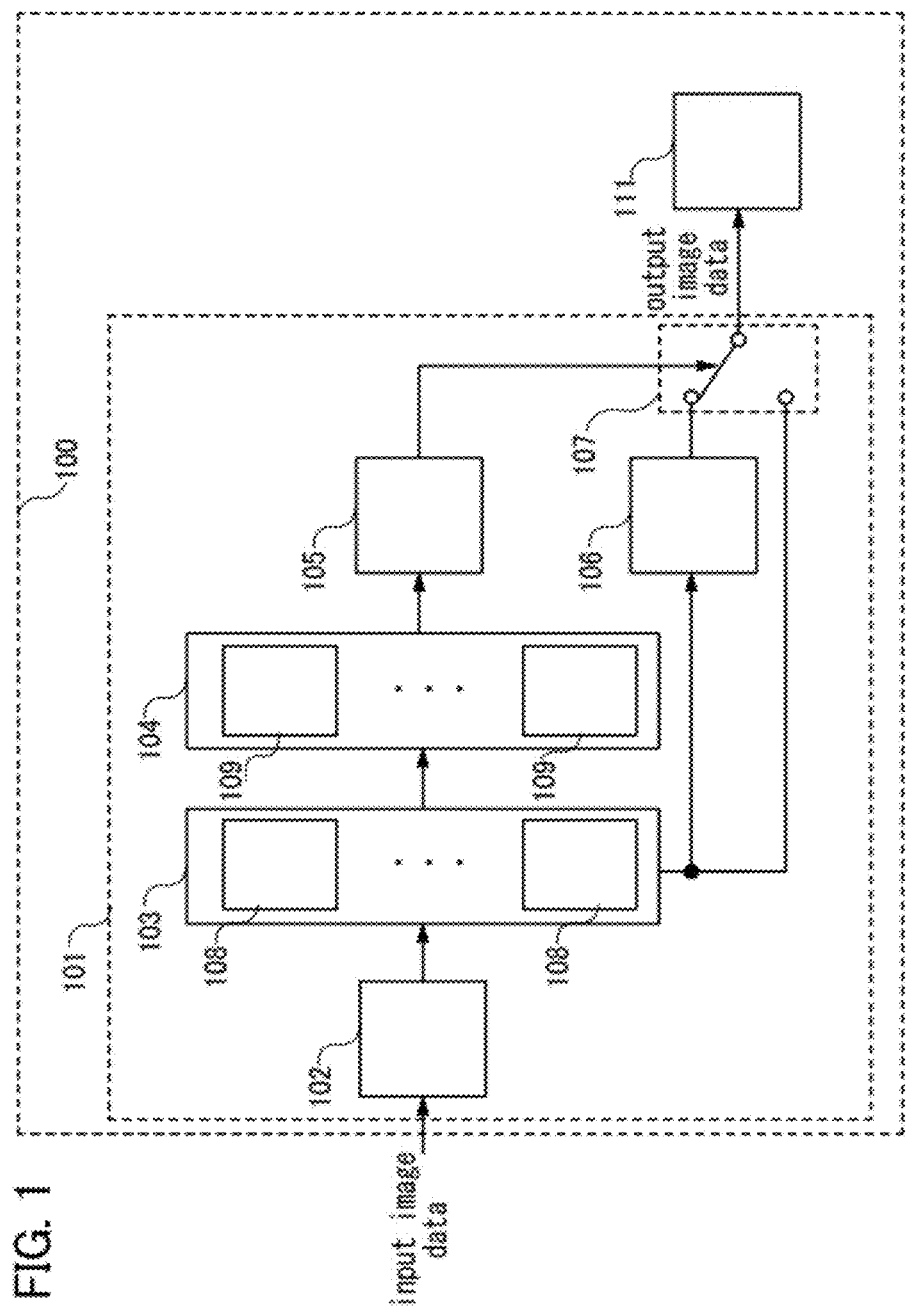
FIG. 1 illustrates Embodiment 1.

First, a block diagram of an image processing device for performing image processing in an image processing system is described. FIG. 1 illustrates an image processing system for displaying moving images by using images divided into a plurality of frames. An image processing system 100 includes an image processing device 101 and a display device 111. The image processing device 101 includes a frame selection circuit 102, an image memory portion 103, a histogram conversion circuit portion 104, a histogram comparator portion 105, an image correction circuit portion 106, and an output switching switch portion 107. The image memory portion 103 includes a plurality of image memories 108. The histogram conversion circuit portion 104 includes a histogram arithmetic circuit 109 corresponding to the plurality of image memories 108.

The image processing device 101 illustrated in FIG. 1 is described. Input image data is supplied to the image processing device 101 illustrated in FIG. 1 from the outside. The input image data is moving image data and includes at least one piece of the image data of the images divided into the plurality of frames. The input image data is stored in the plurality of image memories 108 included in the image memory portion 103 through the frame selection circuit 102. The frame selection circuit 102 stores the input image data in the image memories 108 every image data of frames.

Note that input image data described in this specification is image data having a digital gray level. In the case where the input image data is image data having an analog gray level, input image data which is input to the image processing device 101 may be input after it is converted into input image data having a digital gray level by an A/D converter.

Note that in this embodiment, image data of each frame is referred to as, for example, image data of an $n^{th}$ frame (n is a natural number) and image data of an $(n+1)^{th}$ frame. Note that one frame period is preferably set to approximately 1/60 second so that human eyes do not perceive flickers. Therefore, the number of frames for displaying images (also referred to as a frame rate) is preferably set to approximately 60 frames for one second.

Note that the number of the image memories 108 provided in the image memory portion 103 is preferably determined by the amount of input image data for one frame and the memory capacity of the image memory 108. For example, in the case where the amount of the input image data for one frame is the same or substantially the same as the memory capacity of the image memory 108, two image memories 108 for storing the input image data for two frames may be provided. In this case, in a retrace interval through a third frame after the input image data for the two frames is stored, image processing may be performed. Alternatively, three image memories 108 may be provided in order to store input image data of the $n^{th}$ frame, input image data of the $(n+1)^{th}$ frame, and input image data of an $(n+2)^{th}$ frame. Note that in the case where the amount of the input image data for one frame is smaller than the memory capacity of the image memory 108, one image memory 108 may be provided in the image memory portion 103 and input image data for a plurality of frames may be stored in the image memory 108.

The histogram conversion circuit portion 104 is a circuit for forming a histogram of gray levels from the input image data of each frame, which is stored in the plurality of image memories 108, and for storing the histogram. The histogram arithmetic circuit 109 in the histogram conversion circuit portion 104 calculates a histogram related to frequencies of gray levels of image data which is input to each pixel every frame and stores the histogram. Note that a gray level refers to luminance in each pixel. Note that in the case where one color is expressed by three pixels of red (R), green (G), and blue (B) as color elements, the luminance of the three pixels is referred to as luminance after weighting of the colors of R, G, and B is performed. Weighting of gray levels of R, G, and B refers to weighting of colors by integration in the colors, and calculates the sum of the integrated values. In specific, if the gray level of R is denoted by $R_G$, the gray level of G is denoted by $G_G$, and the gray level of B is denoted by $B_G$ with respect to luminance S, the luminance $S=0.30 R_G+0.59 G_G+0.11 B_G$ in an NTSC system. Note that a color which is different from R, G, and B may be used as a color element. For example, three pixels of yellow, cyan, and magenta may be used, or four colors may be used by addition of white.

The histogram comparator portion 105 is a circuit for calculating a difference between histograms obtained in the histogram arithmetic circuit 109 in the histogram conversion circuit portion 104 and for determining whether to correct input image data in accordance with the difference. In specific, the histogram comparator portion 105 is a circuit for calculating a difference between a histogram of the $n^{th}$ frame and a histogram of the $(n+1)^{th}$ frame, which are obtained in the histogram arithmetic circuit 109, and for determining whether to correct input image data in accordance with whether the difference exceeds a predetermined threshold value.

Note that in this specification, terms such as "first", "second", "third", and "$N^{th}$" (N is a natural number) are used in order to avoid confusion among components and do not limit the components numerically.

The image correction circuit portion 106 is a circuit for reading the image data which is stored in the image memory portion 103 and which corresponds to the image data compared in the histogram comparator portion 105 so that gamma correction or tone curve correction is performed on the image data and for storing the image data.

Figure 5:
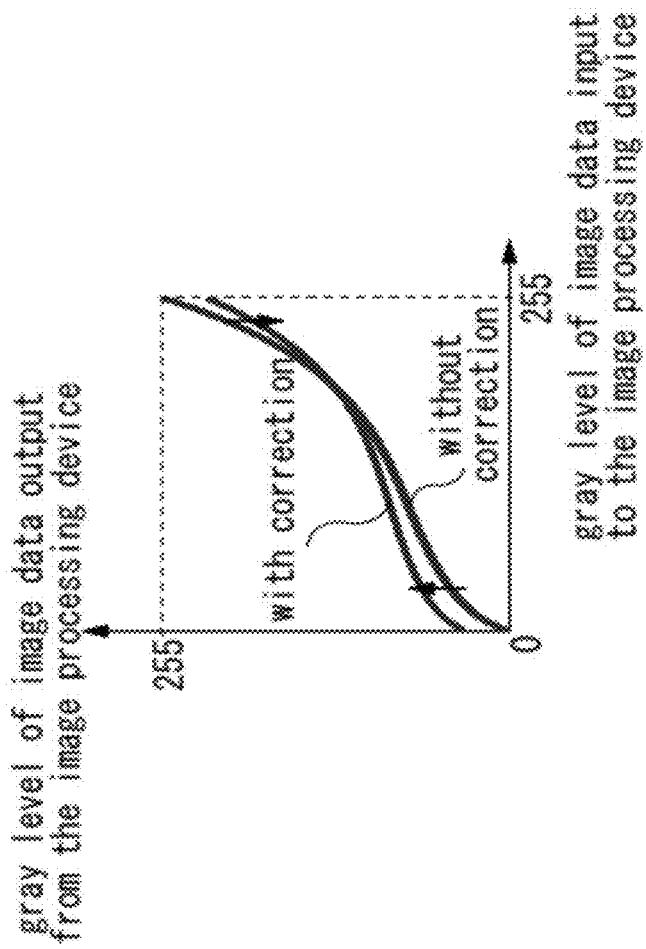
FIG. 5 illustrates Embodiment 1.

The gamma correction with a gamma correction table or the tone curve correction performed in the image correction circuit portion 106 is correction by which the range between the upper limit and the lower limit of a gray level is narrowed when the gray level of image data which is input to the image processing device 101 is compared with the gray level of image data which is output from the image processing device 101. FIG. 5 illustrates a specific relationship between input and output of gray levels of image data in the image correction circuit portion 106. As illustrated in FIG. 5, when the gray level of image data which is input is compared with the gray level of image data which is output, correction is performed by which a region of low grayscale is shifted to a high grayscale side and a region of high grayscale is shifted to a low grayscale side. With correction for narrowing a dynamic range by the gamma correction with a gamma correction table or the tone curve correction performed in the image correction circuit portion 106, large blinking of light can be relieved, so that eyestrain or unwellness can be reduced.

The output switching switch portion 107 is a circuit including a switch which selects and switches whether output image data which is output from the image processing device 101 is corrected image data which corresponds to output from the image correction circuit portion 106 or image data from the image memory portion 103, which is not corrected, in accordance with output of the histogram comparator portion 105.

The output switching switch portion 107 can selectively switch whether to correct realistic moving images with a high dynamic range in accordance with the strength and weakness of blinking of light from the comparison results in the histogram comparator portion 105. Therefore, as compared to processing by which an adverse effect of large blinking of light is relieved by simply lowering the brightness of the entire screen, the high image quality of moving images can be kept while relieving an adverse effect of large blinking of light.

Note that a variety of switches can be used as a switch. For example, an electrical switch, a mechanical switch, or the like can be used. For example, a transistor (e.g., a bipolar transistor or a MOS transistor) or the like can be used as a switch. Alternatively, a logic circuit in which transistors are combined with each other can be used as a switch.

Figure 2:
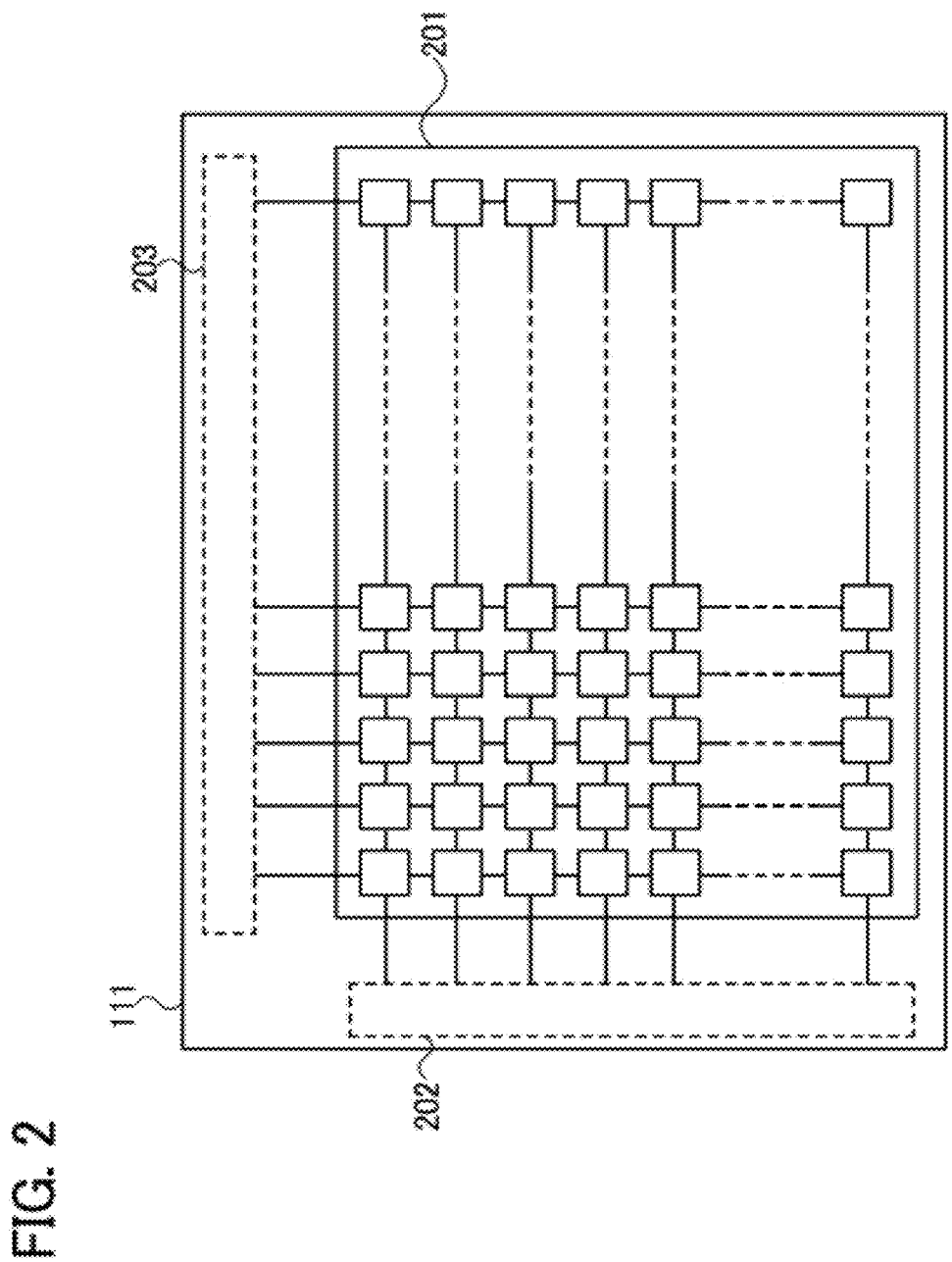
FIG. 2 illustrates Embodiment 1.

Note that the display device 111 in which the input image data is output from the image processing device 101 includes a display portion including a plurality of pixels, a scan line driver circuit, and a signal line driver circuit. FIG. 2 illustrates an example of the display device 111 including a display portion. The display device 111 illustrated in FIG. 2 includes a display portion 201 where a plurality of pixels are arranged in matrix, a scan line driver circuit 202 for driving the plurality of pixels, and a signal line driver circuit 203 for supplying image data to the plurality of pixels. Note that any structure can be used as long as the image processing device 101 and the display device 111 are electrically connected to each other. A structure where electrical signals are input and output through an interface such as an FPC may be used, or a structure where the image processing device 101 and the display device 111 are provided over the same substrate may be used.

Further, as the image memory 108 in the image memory portion 103 or the like, a static memory (SRAM), a dynamic memory (DRAM), a ferroelectric memory (FeRAM), an EEPROM, a flash memory, or the like can be used, for example. Note that in the case where a DRAM is used, it is necessary to add a regular refresh function.

Next, in the block diagram of the image processing system, the image processing device 101 in FIG. 1 is specifically described. The image processing device 101 illustrated in FIG. 3 includes the frame selection circuit 102, the image memory portion 103, the histogram conversion circuit portion 104, the histogram comparator portion 105, the image correction circuit portion 106, and the output switching switch portion 107, as illustrated in FIG. 1. The image memory portion 103 includes a first image memory 301A in which the input image data of the $n^{th}$ frame is stored and a second image memory 301B in which the input image data of the $(n+1)^{th}$ frame is stored. Note that output terminals of the plurality of image memories 301A and 301B are electrically connected to an input terminal of a selector 302 which is controlled by the frame selection circuit 102, and an output terminal of the selector 302 is electrically connected to the image correction circuit portion 106 and the output switching switch portion 107.

Figure 3:
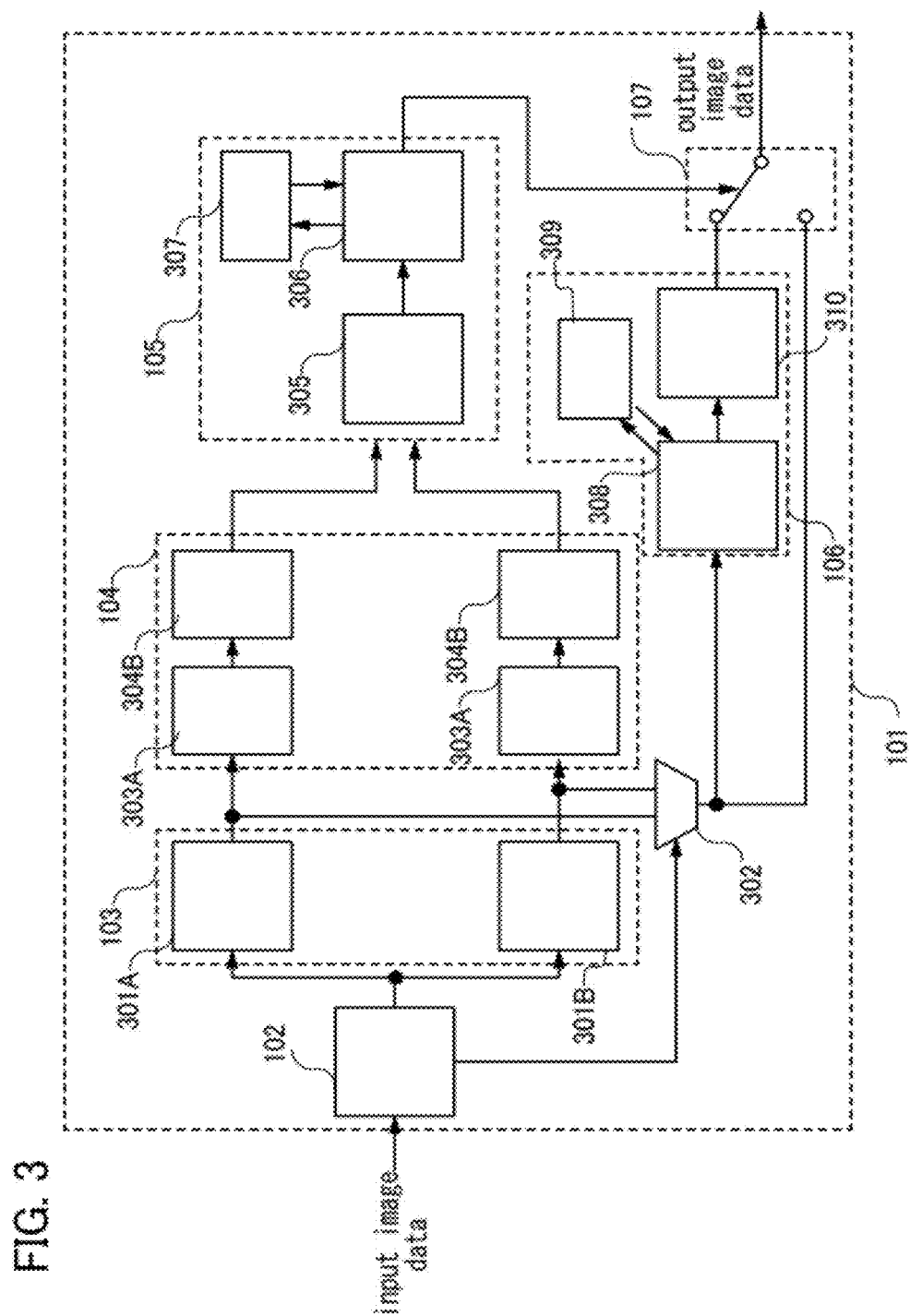
FIG. 3 illustrates Embodiment 1.

Note that in FIG. 3, the input image data of the $n^{th}$ frame is compared with the input image data of the $(n+1)^{th}$ frame, and a structure where two image memories are provided in the image memory portion 103 is illustrated. In a structure where the input image data from the $n^{th}$ frame to of an $(n+m)^{th}$ frame (m is a natural number) are compared, input image data of a plurality of frames should be stored. Thus, (m+1) pieces of image memories should be provided.

The histogram conversion portion 104 illustrated in FIG. 3 is described. The histogram conversion portion 104 illustrated in FIG. 3 includes a first histogram arithmetic circuit 303A, a second histogram arithmetic circuit 303B, a first histogram storage memory 304A, and a second histogram storage memory 304B. The first histogram arithmetic circuit 303A illustrated in FIG. 3 forms the histogram of the $n^{th}$ frame when the input image data of the $n^{th}$ frame, which is stored in the first image memory 301A, is supplied from the outside. The formed histogram of the $n^{th}$ frame is stored in the first histogram storage memory 304A. In a similar manner, the second histogram arithmetic circuit 303B illustrated in FIG. 3 forms the histogram of the (n+1)$^{th}$ frame when the input image data of the (n+1)$^{th}$ frame, which is stored in the second image memory 301B, is supplied from the outside. The formed histogram of the (n+1)$^{th}$ frame is stored in the second histogram storage memory 304B.

The histogram comparator portion 105 illustrated in FIG. 3 is described. The histogram comparator portion 105 includes a histogram difference arithmetic circuit 305, a processing determination circuit 306, and a threshold memory 307. The histogram difference arithmetic circuit 305 reads the histogram of the n$^{th}$ frame from the first histogram storage memory 304A and reads the histogram of the (n+1)$^{th}$ frame from the second histogram storage memory 304B so that a difference between the two histograms is calculated. The processing determination circuit 306 compares the difference of the histograms, which is output of the histogram difference arithmetic circuit 305, with a threshold curve which is read from the threshold memory 307 and outputs the results of processing determination.

The image correction circuit portion 106 illustrated in FIG. 3 is described. The image correction circuit portion 106 includes an image correction circuit 308, a correction memory 309, and a correction image memory 310. The image correction circuit 308 is a circuit which performs gamma correction or tone curve correction on image data, which is selected by the selector 302, and which outputs the corrected image data to the correction image memory 310. The correction image memory 310 is a circuit for storing the corrected image data.

The gamma correction with a gamma correction table stored in the correction memory 309 or the tone curve correction is correction by which the range between the upper limit and the lower limit of a gray level is narrowed when the gray level of image data which is input to the image processing device 101 is compared with the gray level of image data which is output from the image processing device 101, as illustrated in FIG. 5. With correction for narrowing a dynamic range by the gamma correction with a gamma correction table stored in the correction memory 309 or the tone curve correction, large blinking of light can be relieved, so that eyestrain or unwellness can be reduced.

The output switching switch portion 107 illustrated in FIG. 3 is a circuit including a switch which selects and switches whether output image data which is output from the image processing device 101 is corrected image data which corresponds to output from the correction image memory 310 or image data output from the selector 302, which is not corrected, in accordance with output of the processing determination circuit 306.

The output switching switch portion 107 can selectively switch whether to correct realistic moving images with a high dynamic range in accordance with the strength and weakness of blinking of light from the comparison results in the processing determination circuit 306. Therefore, as compared to processing by which an adverse effect of large blinking of light is relieved by simply lowering the brightness of the entire screen, the high image quality of moving images can be kept while relieving an adverse effect of large blinking of light.

Figure 4:
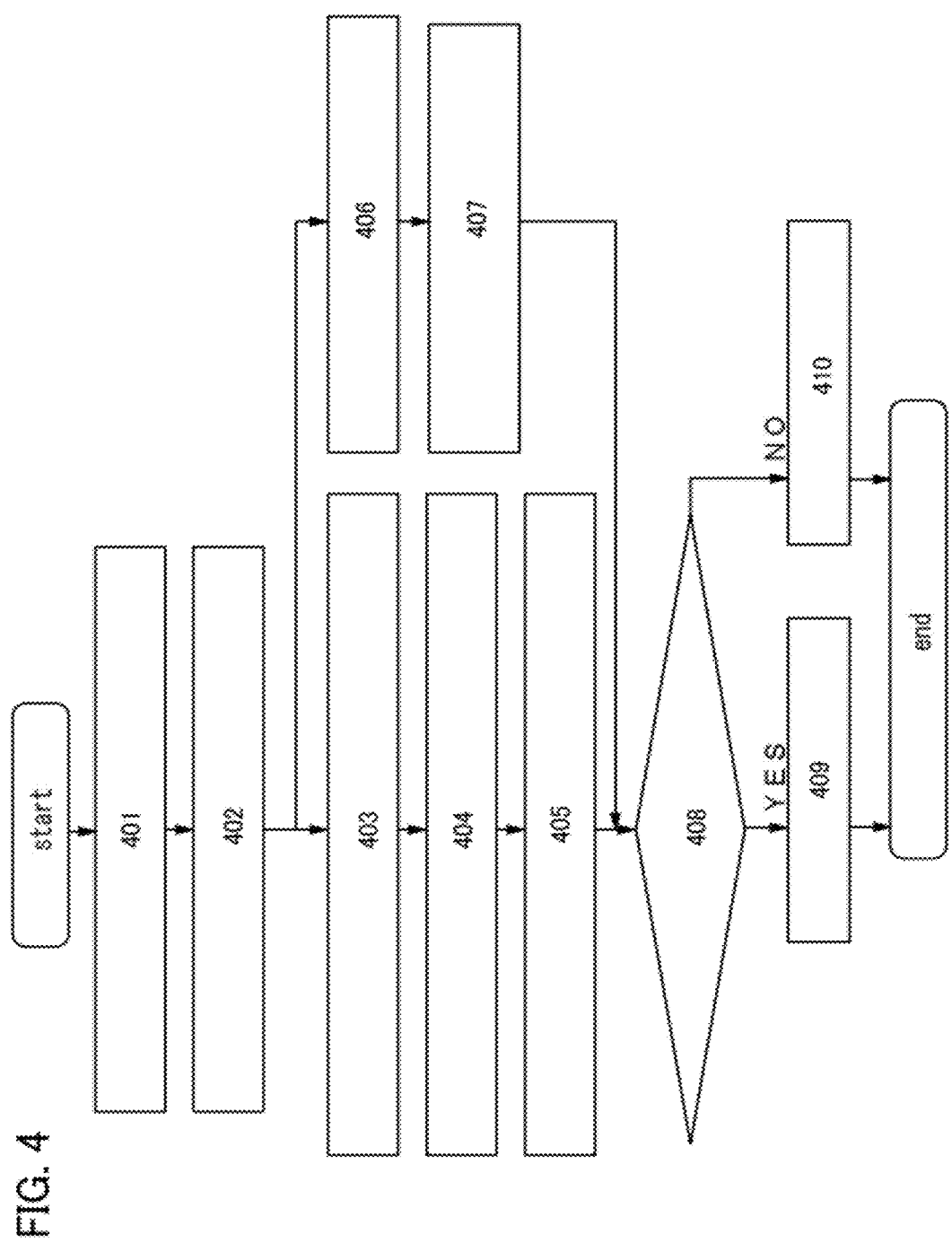
FIG. 4 illustrates Embodiment 1.

Next, a method of image processing performed in the image processing device 101 in FIG. 3 is described. FIG. 4 is a flow chart of the method of image processing.

In the image processing device 101, first, the first image memory 301A is selected by the frame selection circuit 102, and the image data of the n$^{th}$ frame is input (Step 401).

Next, in the image processing device 101, the second image memory 301B is selected by the frame selection circuit 102, and the image data of the (n+1)$^{th}$ frame is input (Step 402).

Next, the first histogram arithmetic circuit 303A calculates a histogram of gray levels from image data of the first image memory 301A, and the histogram of the gray levels is stored in the first histogram storage memory 304A (Step 403).

Next, the second histogram arithmetic circuit 303B calculates a histogram of gray levels from image data of the second image memory 301B, and the histogram of the gray levels is stored in the second histogram storage memory 304B (Step 404).

Next, the histogram difference arithmetic circuit 305 calculates a difference between frequencies of luminance of histograms stored in the first histogram storage memory 304A and the second histogram storage memory 304B and outputs the difference to the processing determination circuit 306 (Step 405).

Further, as well as Steps 403 to 405, the selector 302 selects the image data of the first image memory 301A or the image data of the second image memory 301B by control from the frame selection circuit 102 and outputs either image data (Step 406).

Further, after Step 406, the image correction circuit 308 reads the gamma correction with a gamma correction table stored in the correction memory 309 or the tone curve correction and corrects the image data. The corrected image data is stored in the correction image memory 310 (Step 407).

Next, after Step 405 and Step 407, the processing determination circuit 306 determines whether the difference between frequencies of the luminance of the histograms is larger than the threshold curve which is read from the threshold memory 307 (Step 408).

Next, in the processing in Step 408, in the case where the difference between frequencies of the luminance of the histograms is larger than the threshold curve which is read from the threshold memory 307, the switch in the output switching switch portion 107 is switched on an output side of the correction image memory 310 (Step 409). Alternatively, in the processing in Step 408, in the case where the difference between frequencies of the luminance of the histograms is smaller than or equal to the threshold curve which is read from the threshold memory 307, the switch in the output switching switch portion 107 is switched on an output side of the selector 302 (Step 410).

Through the above method of image processing, the output switching switch portion 107 can selectively switch whether to correct realistic moving images with a high dynamic range in accordance with the strength and weakness of blinking of light from the comparison results in the processing determination circuit 306. Therefore, as compared to processing by which an adverse effect of large blinking of light is relieved by simply lowering the brightness of the entire screen, the high image quality of moving images can be kept while relieving an adverse effect of large blinking of light.

Further, the gamma correction with a gamma correction table stored in the correction memory 309 or the tone curve correction is correction by which the range between the upper limit and the lower limit of a gray level is narrowed when the gray level of image data which is input to the image processing device 101 is compared with the gray level of image data which is output from the image processing device 101, as illustrated in FIG. 5. With correction for narrowing a dynamic range by the gamma correction with a gamma correction table stored in the correction memory 309 or the tone curve correction, large blinking of light can be relieved, so that eyestrain or unwellness can be reduced.

Note that Step 403 to Step 410 are performed in a retrace interval from Step 402 at which the image data of the $(n+1)^{th}$ frame is input to a period at which the image data of the $(n+2)^{th}$ frame is input.

Figure 6:
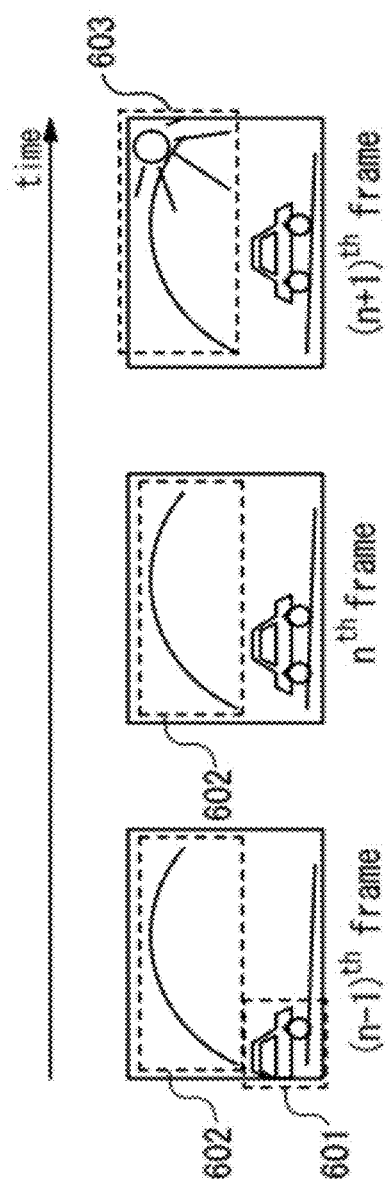
FIG. 6 illustrates Embodiment 1.

Next, a method of image processing, by which image processing is performed by executing the flow chart in FIG. 4, is specifically described with reference to images. FIG. 6 illustrates images of sequential three frames, which are divided into a plurality of frames used for forming moving images. The method of image processing is described with reference to FIG. 6.

FIG. 6 illustrates an image of an $(n-1)^{th}$ frame, an image of the $n^{th}$ frame, and an image of the $(n+1)^{th}$ frame. A moving object 601 and a background 602 are illustrated in each image. The image of the $(n-1)^{th}$ frame, the image of the $n^{th}$ frame, and the image of the $(n+1)^{th}$ frame are sequentially displayed over time. Note that in the image of the $(n-1)^{th}$ frame and the image of the $n^{th}$ frame, a change where the moving object 601 moves is shown. In addition, in the image of the $n^{th}$ frame and the image of the $(n+1)^{th}$ frame, a change where the background 602 is changed into a background 603 is shown.

Figure 7:
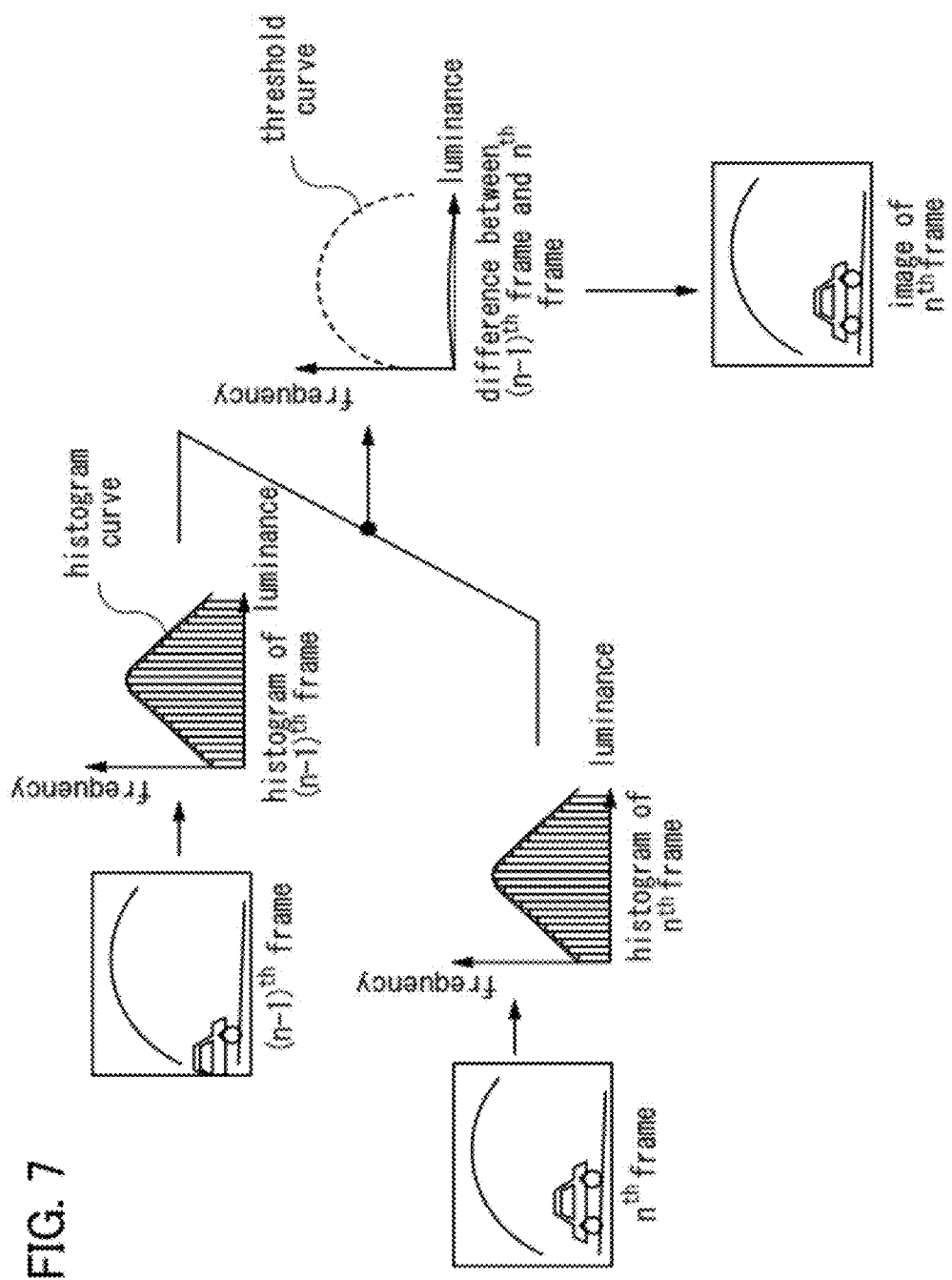
FIG. 7 illustrates Embodiment 1.

First, FIG. 7 illustrates an example of performing image processing on the image of the $(n-1)^{th}$ frame and the image of the $n^{th}$ frame illustrated in FIG. 6 by executing the flow chart in FIG. 4.

In FIG. 7, in the image of the $(n-1)^{th}$ frame and the image of the $n^{th}$ frame, a change where the moving object 601 moves is shown, as illustrated in FIG. 6; however, curves in histograms illustrating frequencies related to gray levels, i.e., luminance (hereinafter referred to as histogram curves) are similar between the $(n-1)^{th}$ frame and the $n^{th}$ frame. Therefore, when a difference between the histogram of the $(n-1)^{th}$ frame and the histogram of the $n^{th}$ frame is calculated, there is little difference, as illustrated in FIG. 7. Accordingly, the difference between the histograms is smaller than or equal to the threshold curve, so that as for the image of the $n^{th}$ frame, image data which is not corrected is output to the display device as output image data.

Figure 8:
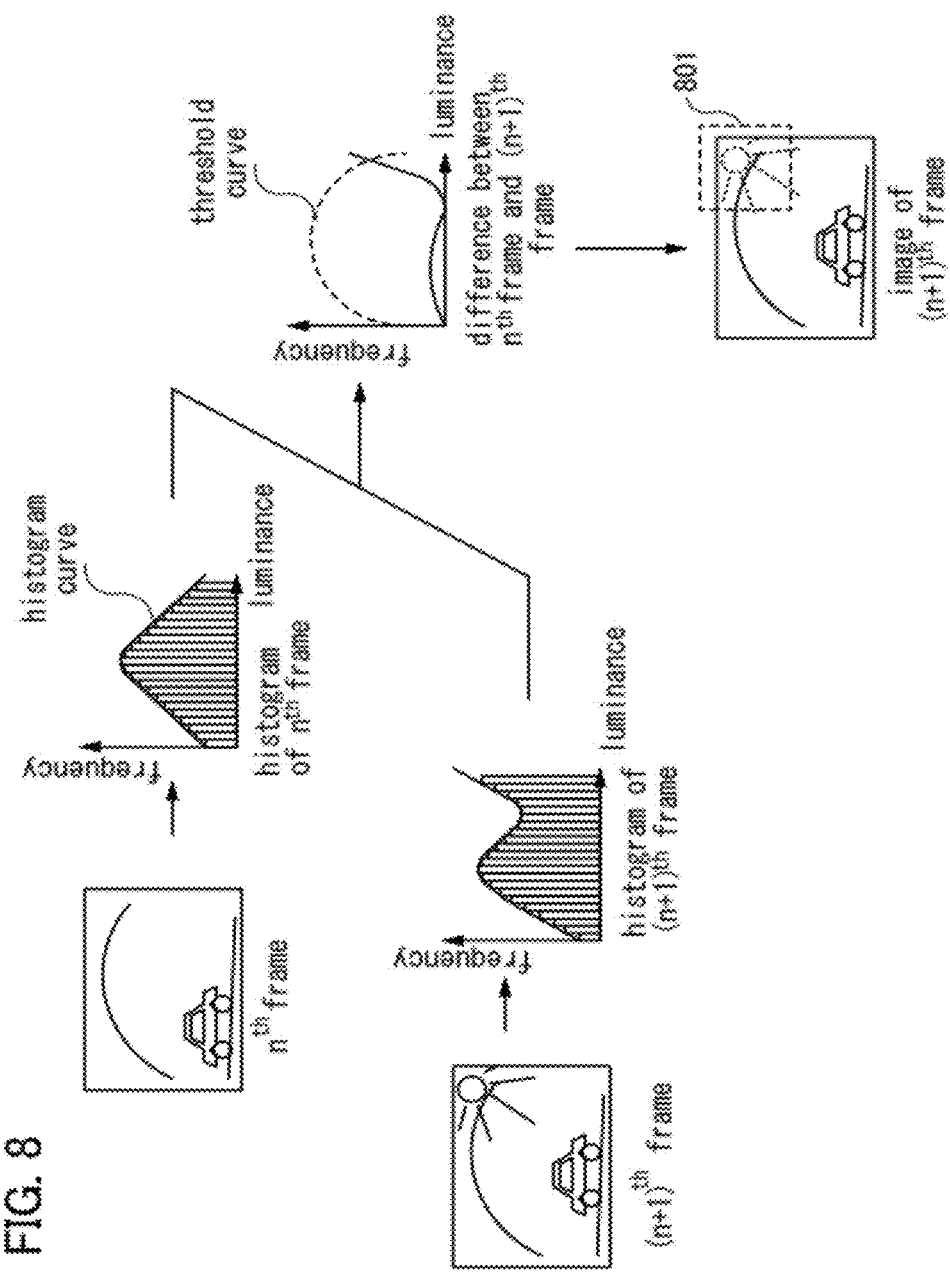
FIG. 8 illustrates Embodiment 1.

Next, FIG. 8 illustrates an example of performing image processing on the image of the $n^{th}$ frame and the image of the $(n+1)^{th}$ frame illustrated in FIG. 6 by executing the flow chart in FIG. 4.

In FIG. 8, in the image of the $n^{th}$ frame and the image of the $(n+1)^{th}$ frame, a change where the background 602 is changed into the background 603 is shown, as illustrated in FIG. 6. Histogram curves in histograms illustrating frequencies related to gray levels, i.e., luminance are different between the $n^{th}$ frame and the $(n+1)^{th}$ frame. Therefore, when a difference between the histogram of the $n^{th}$ frame and the histogram of the $(n+1)^{th}$ frame is calculated, the difference is larger on a high luminance side, as illustrated in FIG. 8. Accordingly, the difference between the histograms is larger than the threshold curve, so that as for the image of the $(n+1)^{th}$ frame, correction for narrowing a dynamic range by the gamma correction with a gamma correction table stored in the correction memory 309 or the tone curve correction is performed, and output image data whose brightness in a region 801 is decreased is output to the display device.

Note that the threshold curves illustrated in FIGS. 7 and 8 have fewer frequencies of regions of high luminance and low luminance. By setting the threshold values of the regions of high luminance and low luminance to smaller values, changes related to high luminance or low luminance, which cause large blinking of light, can be detected according to the shapes of the histogram curves. Further, in FIG. 7, the shapes of the threshold curves are semicircular; however, the shapes of the threshold curves are not limited to semicircular shapes. The threshold curves may be linear, or may be expressed by polynomial functions. Alternatively, the threshold curves may be changed in accordance with ambient environment or the like.

As described above, in the structure described in this embodiment, whether to correct realistic moving images with a high dynamic range can be selectively switched in accordance with the strength and weakness of blinking of light. Therefore, as compared to processing by which an adverse effect of large blinking of light is relieved by simply lowering the brightness of the entire screen, the high image quality of moving images can be kept while relieving an adverse effect of large blinking of light. Further, in the structure described in this embodiment, correction by which the range between the upper limit and the lower limit of a gray level is narrowed is performed. With correction for narrowing a dynamic range by the gamma correction with a gamma correction table stored in the correction memory 309 or the tone curve correction, large blinking of light can be relieved, so that eyestrain or unwellness can be reduced.

This embodiment can be combined with any of the other embodiments as appropriate.

Embodiment 2

In this embodiment, a structure is described in which the threshold curve stored in a threshold memory, which is described in Embodiment 1, is changed in accordance with a signal from an external illuminance detector for detecting ambient environment.

Figure 9:
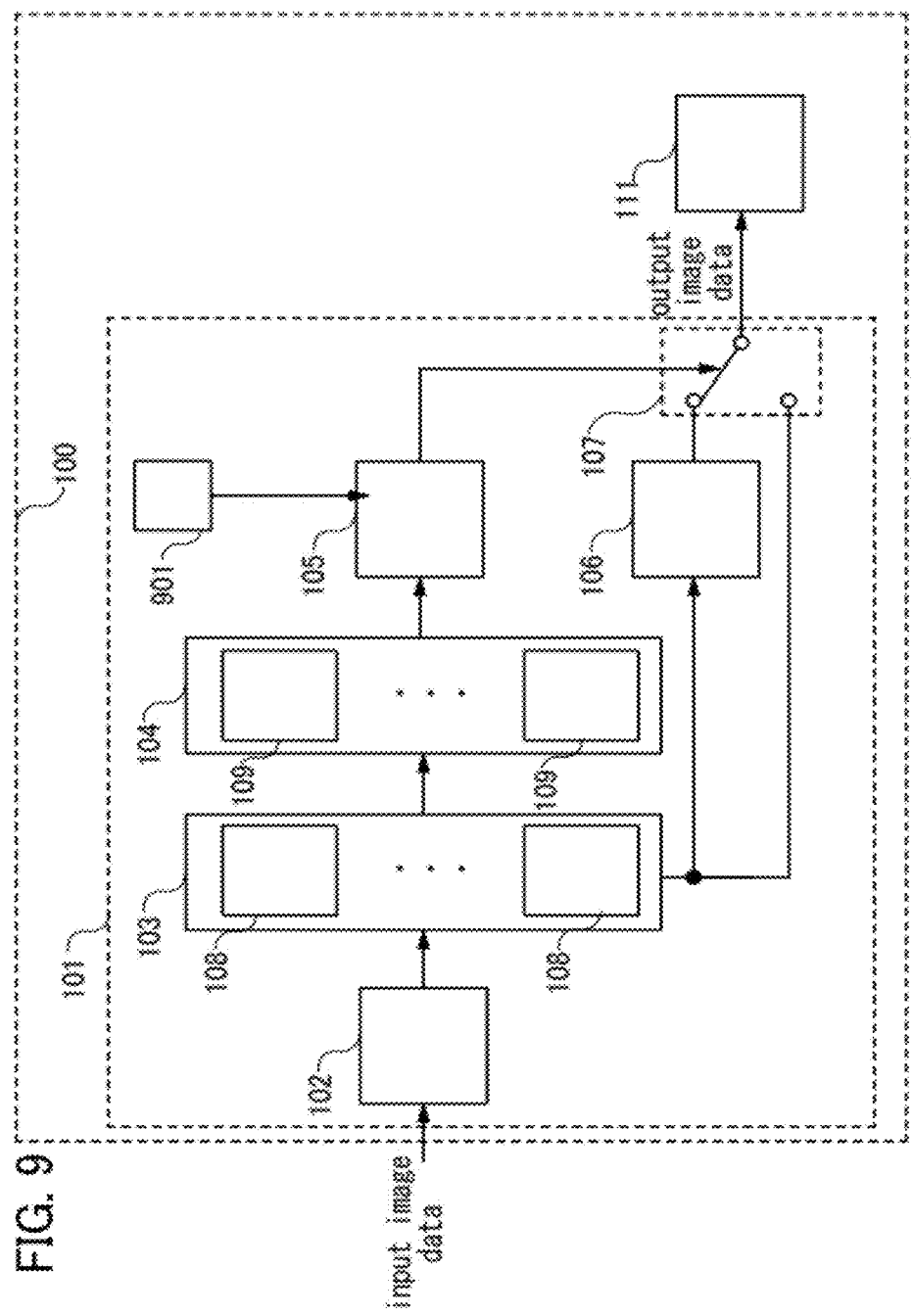
FIG. 9 illustrates Embodiment 2.

First, a block diagram of an image processing device for performing image processing in an image processing system is described. FIG. 9 illustrates an image processing system for displaying moving images by using images divided into a plurality of frames. The image processing system 100 includes the image processing device 101 and the display device 111. The image processing device 101 includes the frame selection circuit 102, the image memory portion 103, the histogram conversion circuit portion 104, the histogram comparator portion 105, the image correction circuit portion 106, the output switching switch portion 107, and an external illuminance detector 901. The image memory portion 103 includes the plurality of image memories 108. The histogram conversion circuit 104 portion includes the histogram arithmetic circuit 109 corresponding to the plurality of image memories 108.

Note that the external illuminance detector 901 converts the illuminance of the outside of an image processing system into electrical signals and outputs the electrical signals. Specifically, the external illuminance detector 901 may be formed using a photoelectric conversion element such as a photodiode.

The structure of the image processing device illustrated in FIG. 9 differs from the structure of the image processing device illustrated in FIG. 1 in that the external illuminance detector 901 is provided. Thus, in this embodiment, the external illuminance detector 901 is described, and description of the other components is omitted.

The histogram comparator portion 105 illustrated in FIG. 9 is a circuit for calculating a difference between histograms obtained in the histogram arithmetic circuit 109 and for determining whether to correct input image data in accordance with the difference. In specific, the histogram comparator portion 105 is a circuit for calculating a difference between the histogram of the $n^{th}$ frame and the histogram of the $(n+1)^{th}$ frame, which are obtained in the histogram arithmetic circuit 109, and for determining whether to correct input image data in accordance with whether the difference exceeds a threshold value which is set in accordance with a signal from the external illuminance detector 901.

Human eyes are influenced by light adaptation or dark adaptation with respect to blinking of intense light in watching moving images. Light adaptation or dark adaptation is changed in accordance with the brightness of external environment. For example, as for moving images watched in a dark room and moving images watched in a bright room, human eyes perceive moving images watched in a dark room brighter. Therefore, by controlling the threshold value with a circuit for determining whether moving images are corrected by providing the external illuminance detector 901, the high image quality of moving images can be more surely kept and an adverse effect of large blinking of light can be more surely relieved.

Next, in the block diagram of the image processing system, the image processing device 101 in FIG. 9 is specifically described. The image processing device 101 illustrated in FIG. 10 includes the frame selection circuit 102, the image memory portion 103, the histogram conversion circuit portion 104, the histogram comparator portion 105, the image correction circuit portion 106, the output switching switch portion 107, and the external illuminance detector 901, as illustrated in FIG. 9. The image memory portion 103 includes the first image memory 301A in which the input image data of the $n^{th}$ frame is stored and the second image memory 301B in which the input image data of the $(n+1)^{th}$ frame is stored. Note that the output terminals of the plurality of image memories 301A and 301B are electrically connected to the input terminal of the selector 302 which is controlled by the frame selection circuit 102, and the output terminal of the selector 302 is electrically connected to the image correction circuit portion 106 and the output switching switch portion 107.

Figure 10:
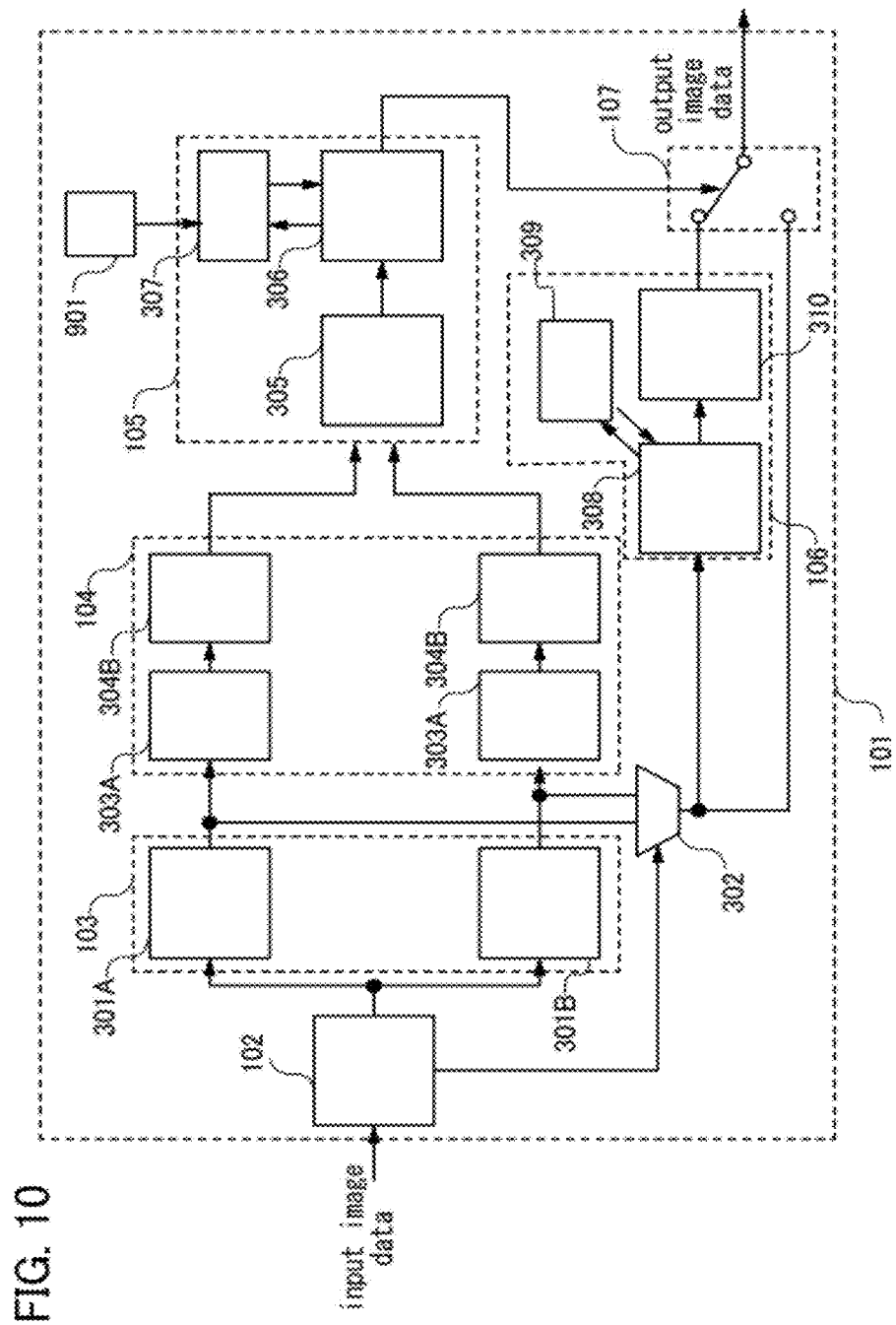
FIG. 10 illustrates Embodiment 2.

The structure of image processing device illustrated in FIG. 10 differs from the structure of the image processing device illustrated in FIG. 3 in that the external illuminance detector 901 is provided. Thus, in this embodiment, the external illuminance detector 901 is described, and description of the other components is omitted.

The histogram comparator portion 105 illustrated in FIG. 10 is described. The histogram comparator portion 105 includes the histogram difference arithmetic circuit 305, the processing determination circuit 306, and the threshold memory 307. The histogram difference arithmetic circuit 305 reads the histogram of the $n^{th}$ frame from the first histogram storage memory 304A and reads the histogram of the $(n+1)^{th}$ frame from the second histogram storage memory 304B so that a difference between the two histograms is calculated. The processing determination circuit 306 compares the difference of the histograms, which is output of the histogram difference arithmetic circuit 305, with a threshold curve which is read from the threshold memory 307 in accordance with signals from the external illuminance detector 901 and outputs the results of processing determination.

By controlling the threshold value with a circuit for determining whether moving images are corrected by providing the external illuminance detector 901 as illustrated in FIG. 10, the high image quality of moving images can be more surely kept and an adverse effect of large blinking of light can be more surely relieved.

Figure 11:
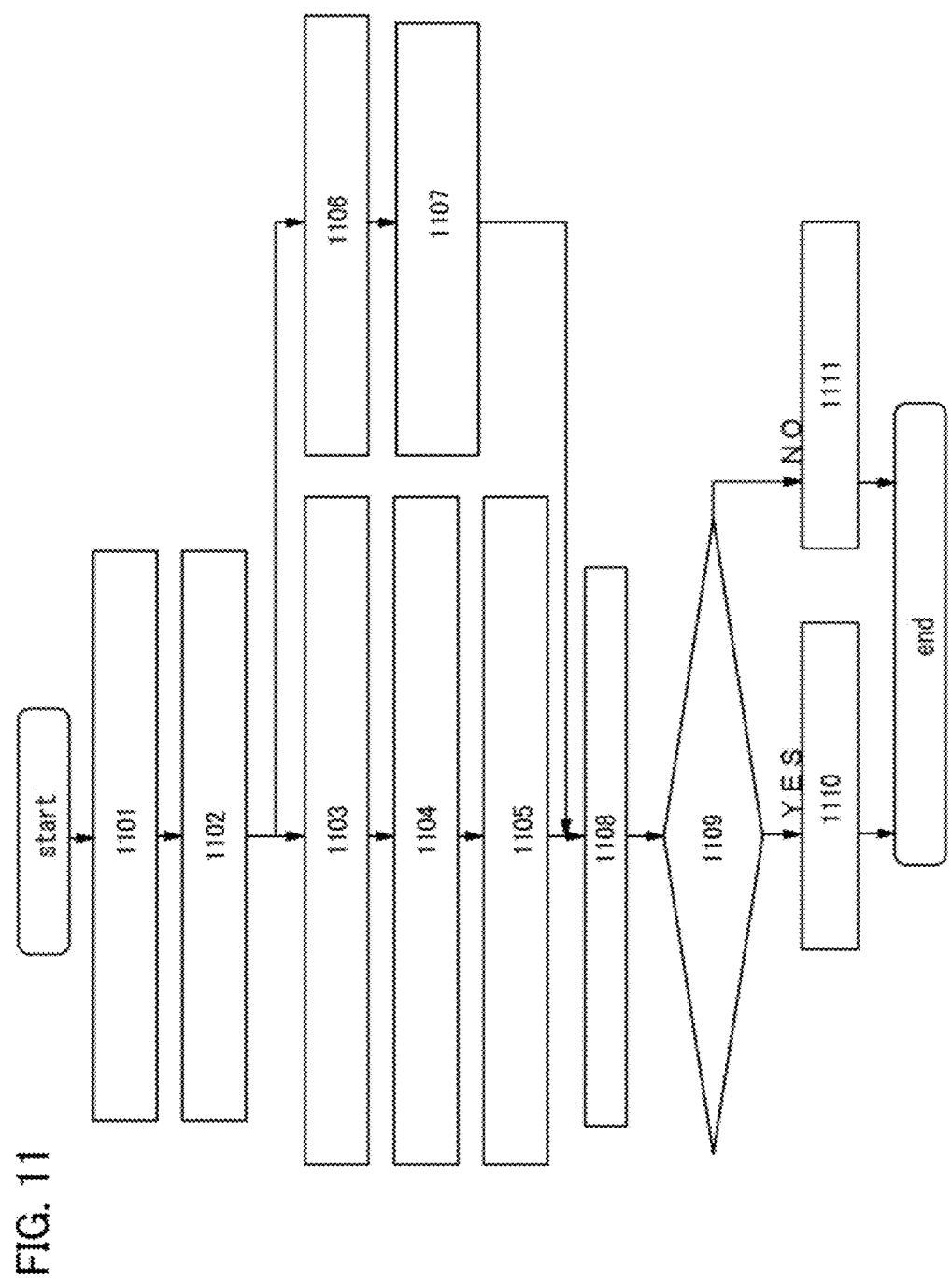
FIG. 11 illustrates Embodiment 2.

Next, a method of image processing performed in the image processing device 101 in FIG. 10 is described. FIG. 11 is a flow chart of the method of image processing.

In the image processing device 101, first, the first image memory 301A is selected by the frame selection circuit 102, and the image data of the $n^{th}$ frame is input (Step 1101).

Next, in the image processing device 101, the second image memory 301B is selected by the frame selection circuit 102, and the image data of the $(n+1)^{th}$ frame is input (Step 1102).

Next, the first histogram arithmetic circuit 303A calculates a histogram of gray levels from image data of the first image memory 301A, and the histogram of the gray levels is stored in the first histogram storage memory 304A (Step 1103).

Next, the second histogram arithmetic circuit 303B calculates a histogram of gray levels from image data of the second image memory 301B, and the histogram of the gray levels is stored in the second histogram storage memory 304B (Step 1104).

Next, the histogram difference arithmetic circuit 305 calculates a difference between frequencies of luminance of histograms stored in the first histogram storage memory 304A and the second histogram storage memory 304B and outputs the difference to the processing determination circuit 306 (Step 1105).

Further, as well as Steps 1103 to 1105, the selector 302 selects the image data of the first image memory 301A or the image data of the second image memory 301B by control from the frame selection circuit 102 and outputs either image data (Step 1106).

Further, after Step 1106, the image correction circuit 308 reads the gamma correction with a gamma correction table stored in the correction memory 309 or the tone curve correction and corrects the image data. The corrected image data is stored in the correction image memory 310 (Step 1107).

Next, after Step 1105 and Step 1107, in the processing determination circuit 306, the threshold curve is selected and read from the threshold memory 307 in accordance with the signals from the external illuminance detector 901 (Step 11108).

Figure 12A:
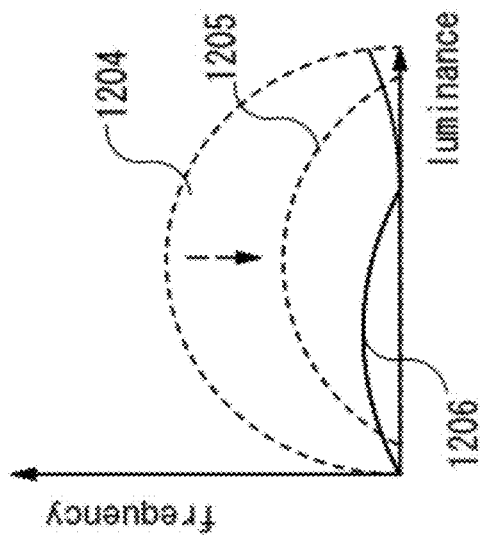
FIGS. 12A and 12B illustrate Embodiment 2.
Figure 12B:
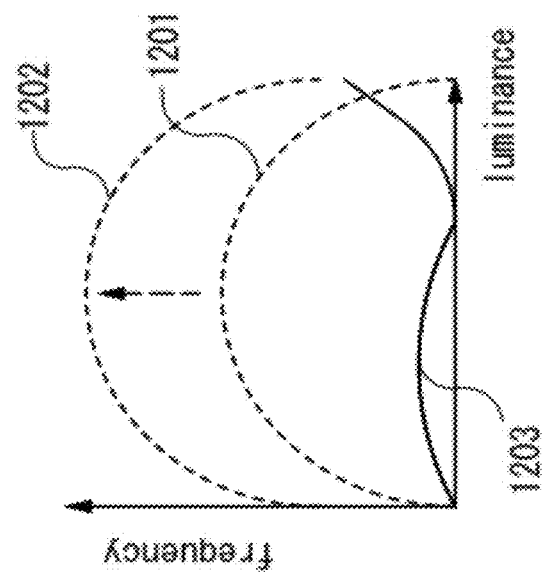

FIGS. 12A and 12B illustrate examples of threshold curves. FIG. 12A illustrates changes in threshold curves in the case where external environment is bright with detection by the external illuminance detector 901. In the case where the external environment is bright, it is possible to set the threshold value larger because human eyes adjust to blinking of light. In FIG. 12A, when a threshold curve 1201 corresponds to the case where the illuminance of the external environment is middle, a threshold curve 1202 corresponds to the case where the external environment is bright. Therefore, for example, in the case in which there is a histogram curve 1203 as illustrated in FIG. 12A, the histogram curve 1203 is less than the threshold curve when the external environment is bright. Thus, image data can be output without being corrected. On the other hand, FIG. 12B illustrates changes in threshold curves in the case where external environment is dark with detection by the external illuminance detector 901. In the case where the external environment is dark, it is preferable to set the threshold value smaller because human eyes do not adjust to blinking of light. In FIG. 12B, when a threshold curve 1204 corresponds to the case where the illuminance of the external environment is middle, a threshold curve 1205 corresponds to the case where the external environment is dark. Therefore, for example, in the case in which there is a histogram curve 1206 as illustrated in FIG. 12B, the histogram curve 1206 is greater than the threshold curve partly when the external environment is dark. Thus, image data which is corrected can be output.

FIG. 11 is described again. After Step 1108, the processing determination circuit 306 determines whether the difference between frequencies of the luminance of the histograms is larger than the threshold curve which is read from the threshold memory 307 (Step 1109).

Next, in the processing in Step 1109, in the case where the difference between frequencies of the luminance of the histograms is larger than the threshold curve which is read from the threshold memory 307, the switch in the output switching switch portion 107 is switched on the output side of the correction image memory 310 (Step 1110). Alternatively, in the processing in Step 1109, in the case where the difference between frequencies of the luminance of the histograms is smaller than or equal to the threshold curve which is read from the threshold memory 307, the switch in the output switching switch portion 107 is switched on the output side of the selector 302 (Step 1111).

As described above, in the structure described in this embodiment, whether to correct realistic moving images with a high dynamic range can be selectively switched in accordance with the strength and weakness of blinking of light. Therefore, as compared to processing by which an adverse effect of large blinking of light is relieved by simply lowering the brightness of the entire screen, the high image quality of moving images can be kept while relieving an adverse effect of large blinking of light. Further, in the structure described in this embodiment, correction by which the range between the upper limit and the lower limit of a gray level is narrowed is performed. With correction for narrowing a dynamic range by the gamma correction with a gamma correction table stored in the correction memory 309 or the tone curve correction, large blinking of light can be relieved, so that eyestrain or unwellness can be reduced. In particular, in this embodiment, image processing can be performed taking brightness and darkness of external environment into consideration.

This embodiment can be combined with any of the other embodiments as appropriate.

Embodiment 3

In this embodiment, the structure of a display device in which images can be displayed by an image processing system is described with reference to FIGS. 13A and 13B. Specifically, the structure of a liquid crystal display device which includes a TFT substrate, a counter substrate, and a liquid crystal layer held between the counter substrate and the TFT substrate is described. FIG. 13A is a top view of the liquid crystal display device. FIG. 13B is a cross-sectional view taken along line C-D in FIG. 13A. Note that FIG. 13B is a cross-sectional view of a top-gate transistor in the case where a crystalline semiconductor film (a polysilicon film) is formed over a substrate 50100 as a semiconductor film and a display mode is an MVA (multi-domain vertical alignment) mode.

In the liquid crystal display device illustrated in FIG. 13A, a pixel portion 50101, a first scan line driver circuit 50105a, a second scan line driver circuit 50105b, and a signal line driver circuit 50106 are formed over a substrate 50100. The pixel portion 50101, the first scan line driver circuit 50105a, the second scan line driver circuit 50105b, and the signal line driver circuit 50106 are sealed between the substrate 50100 and a substrate 50515 with a sealant 50516. In addition, an FPC 50200 and an IC chip 50530 are provided over the substrate 50100 by TAB.

A cross-sectional structure taken along line C-D in FIG. 13A is described with reference to FIG. 13B. The pixel portion 50101 and peripheral driver circuit portions thereof (the first scan line driver circuit 50105a, the second scan line driver circuit 50105b, and the signal line driver circuit 50106) are formed over the substrate 50100. However, here, a driver circuit region 50525 (the second scan line driver circuit 50105b) and a pixel region 50526 (the pixel portion 50101) are illustrated.

First, an insulating film 50501 is deposited over the substrate 50100 as a base film. As the insulating film 50501, a single layer of an insulating film such as a silicon oxide film, a silicon nitride film, or a silicon oxynitride film ($SiO_xN_y$), or a stacked layer including at least two of these films is used. Note that a silicon oxide film is preferably used for part which is in contact with a semiconductor. Accordingly, an electron trap in the base film or hysteresis in transistor characteristics can be suppressed. Further, at least one film containing a large amount of nitrogen is preferably provided as the base film. Thus, the amount of impurities from glass can be reduced.

Next, a semiconductor film 50502 is formed over the insulating film 50501 by photolithography, an inkjet method, a printing method, or the like.

Next, an insulating film 50503 is formed over the semiconductor film 50502 as a gate insulating film. As the insulating film 50503, a single layer structure or a layered structure of a thermal oxide film, a silicon oxide film, a silicon nitride film, a silicon oxynitride film, or the like can be used. A silicon oxide film is preferably used as the insulating film 50503 which is in contact with the semiconductor film 50502. This is because a trap level at an interface between the insulating film and the semiconductor film 50502 can be lowered by using a silicon oxide film. Further, when a gate electrode is formed using Mo, it is preferable that the gate insulating film which is in contact with the gate electrode be a silicon nitride film. This is because Mo is not oxidized by a silicon nitride film. Here, as the insulating film 50503, a 115-nm-thick silicon oxynitride film (composition ratio: Si=32%, O=59%, N=7%, and H=2%) is formed by plasma-enhanced CVD.

Next, a conductive film 50504 is formed over the insulating film 50503 as a gate electrode by photolithography, an inkjet method, a printing method, or the like. As the conductive film 50504, Ti, Mo, Ta, Cr, W, Al, Nd, Cu, Ag, Au, Pt, Nb, Si, Zn, Fe, Ba, Ge, or the like; an alloy of any of these elements; or the like is used. Alternatively, a layered structure of any of these elements or an alloy thereof may be used. Here, the gate electrode is formed using Mo. Mo is preferable because it can be easily etched and is resistant to heat. Note that the semiconductor film 50502 is doped with an impurity element by using the conductive film 50504 or a resist as a mask so that a channel formation region and impurity regions which function as a source region and a drain region are formed. Note that the impurity concentration in the impurity regions may be controlled so that a high-concentration impurity region and a low-concentration impurity region are formed. Note that the conductive film 50504 in a transistor 50521 is formed to be a dual-gate structure. When the transistor 50521 has a dual-gate structure, the amount of off-state current of the transistor 50521 can be reduced. Note that a dual-gate structure refers to a structure having two gate electrodes. Note that a plurality of gate electrodes may be formed over the channel formation region in the transistor. Alternatively, the conductive film 50504 in the transistor 50521 may be formed to be a single-gate structure. Further, a transistor 50519 and a transistor 50520 can be manufactured in the same process as the transistor 50521.

As an interlayer film, an insulating film 50505 is formed over the insulating film 50503 and the conductive film 50504 formed over the insulating film 50503. As the insulating film 50505, an organic material, an inorganic material, or a layered structure thereof can be used. For example, the insulating film 50505 can be formed using a material selected from silicon oxide, silicon nitride, silicon oxynitride, silicon nitride oxide, aluminum nitride, aluminum oxynitride, aluminum nitride oxide containing more nitrogen than oxygen, aluminum oxide, diamond-like carbon (DLC), polysilazane, carbon containing nitrogen (CN), PSG (phosphosilicate glass), BPSG (borophosphosilicate glass), alumina, or other inorganic insulating materials. Alternatively, an organic insulating material may be used. An organic material may be either photosensitive or nonphotosensitive, and polyimide, acrylic, polyamide, polyimide amide, resist, benzocyclobutene, a siloxane resin, or the like can be used. Note that a siloxane resin corresponds to a resin containing a Si—O—Si bond. Siloxane has a skeleton structure formed by a bond of silicon (Si) and oxygen (O). As a substituent, an organic group (e.g., an alkyl group or aromatic hydrocarbon) or fluoro group may be used. The organic group may contain a fluoro group. Note that contact holes are selectively formed in the insulating film 50503 and the insulating film 50505. For example, a contact hole is formed over a top surface of the impurity region of each transistor.

Next, conductive films 50506 are formed over the insulating film 50505 as a drain electrode, a source electrode, and a wiring by photolithography, an inkjet method, a printing method, or the like. As the conductive film 50506, Ti, Mo, Ta, Cr, W, Al, Nd, Cu, Ag, Au, Pt, Nb, Si, Zn, Fe, Ba, Ge, or the like; an alloy of any of these elements; or the like is used. Alternatively, a layered structure of any of these elements or an alloy thereof can be used. Note that in portions where contact holes are formed in the insulating film 50503 and the insulating film 50505, the conductive film 50506 and the impurity region of the semiconductor film 50502 of the transistor are connected to each other.

Next, an insulating film 50507 is formed as a planarization film over the insulating film 50505 and the conductive films 50506 formed over the insulating film 50505. Note that since the insulating film 50507 preferably has favorable flatness and coverage, it is often formed using an organic material. A multi-layer structure in which an organic material is formed over an inorganic material (e.g., silicon oxide, silicon nitride, or silicon oxynitride) may be used. Note that a contact hole is selectively formed in the insulating film 50507. For example, the contact hole is formed over a top surface of a drain electrode of the transistor 50521.

Next, a conductive film 50508 is formed over the insulating film 50507 as a pixel electrode by photolithography, an inkjet method, a printing method, or the like. An opening portion is formed in the conductive film 50508. The opening portion formed in the conductive film 50508 can have the same function as a protrusion used in an MVA mode because the opening portion can make liquid crystal molecules be slanted. Note that as the conductive film 50508, a transparent electrode which transmits light can be used. For example, an indium tin oxide (ITO) film in which tin oxide is mixed in indium oxide, an indium tin silicon oxide (ITSO) film in which silicon oxide is mixed in indium tin oxide (ITO), an indium zinc oxide (IZO) film in which zinc oxide is mixed in indium oxide, a zinc oxide film, a tin oxide film, or the like can be used. Note that although IZO is a transparent conductive material formed by sputtering by using a target in which zinc oxide (ZnO) is mixed in ITO at 2 to 20 wt. %, the present invention is not limited to this. In the case of a reflective electrode, Al, Ag, or the like; an alloy thereof; or the like can be used, for example. Alternatively, a two-layer structure in which Ti, Mo, Ta, Cr, or W, and Al are stacked or a three-layer structure in which Al is interposed between metals such as Ti, Mo, Ta, Cr, and W may be used.

Next, an insulating film 50509 is formed as an alignment film over the insulating film 50507 and the conductive film 50508 formed over the insulating film 50507.

Next, the sealant 50516 is formed around the pixel portion 50101, or around the pixel portion 50101 and the peripheral driver circuit portions thereof by an inkjet method or the like.

Next, the substrate 50515 provided with a conductive film 50512, an insulating film 50511, a protrusion portion 50551, and the like and the substrate 50100 are attached to each other with a spacer 50531 interposed therebetween, and a liquid crystal layer 50510 is provided between the substrates. Note that the substrate 50515 functions as a counter substrate. In addition, the spacer 50531 may be formed by a method by which particles of several μm are dispersed or a method by which a resin film is formed over the entire surface of the substrate and then etched. Further, the conductive film 50512 functions as a counter electrode. As the conductive film 50512, a material similar to that of the conductive film 50508 can be used. Furthermore, the insulating film 50511 functions as an alignment film.

Next, the FPC 50200 is provided over the conductive film 50518 which is electrically connected to the pixel portion 50101 and the peripheral driver circuit portions thereof with an anisotropic conductive layer 50517 interposed therebetween. In addition, the IC chip 50530 is provided over the FPC 50200 with the anisotropic conductive layer 50517 interposed therebetween. That is, the FPC 50200, the anisotropic conductive layer 50517, and the IC chip 50530 are electrically connected to each another.

Note that the anisotropic conductive layer 50517 has a function of transmitting signals and potentials which are input from the FPC 50200 to pixels or peripheral circuits. As the anisotropic conductive layer 50517, a material similar to that of the conductive film 50506, a material similar to that of the conductive film 50504, a material similar to that of the impurity region of the semiconductor film 50502, or a film including two or more layers of the above may be used.

By forming a functional circuit (e.g., a memory or a buffer) in the IC chip 50530, the area of the substrate can be efficiently utilized.

Note that although the cross-sectional view in the case where the display mode is the MVA mode is described in FIG. 13B, the display mode may be a PVA (patterned vertical alignment) mode. In the case of the PVA mode, a slit may be provided for the conductive film 50512 formed on the substrate 50515, so that liquid crystal molecules can be slanted to be aligned. In addition, a protrusion portion 50551 (also referred to as an alignment control protrusion) may be provided for the conductive film for which the slit is provided, so that liquid crystal molecules can be slanted to be aligned. Further, the display mode of liquid crystals is not limited to the MVA mode or the PVA mode, and a TN (twisted nematic) mode, an IPS (in-plane-switching) mode, an FFS (fringe field switching) mode, an ASM (axially symmetric aligned microcell) mode, an OCB (optical compensated birefringence) mode, an FLC (ferroelectric liquid crystal) mode, an AFLC (antiferroelectric liquid crystal) mode, or the like can be used.

Although the structure is described in which the first scan line driver circuit 50105a, the second scan line driver circuit 50105b, and the signal line driver circuit 50106 are formed over the substrate 50100 in the liquid crystal panel in FIGS. 13A and 13B, a structure may be used in which a driver circuit corresponding to the signal line driver circuit 50106 is formed in a driver IC 50601 and is mounted on a liquid crystal panel by COG or the like, as illustrated in a liquid crystal panel in FIG. 14A. By forming the signal line driver circuit 50106 in the driver IC 50601, power can be saved. In addition, by forming the driver IC 50601 as a semiconductor chip formed using a silicon wafer or the like, high speed operation and low power consumption of the liquid crystal panel in FIG. 14A can be achieved.

In a similar manner, as illustrated in a liquid crystal panel in FIG. 14B, a structure may be used in which driver circuits corresponding to the first scan line driver circuit 50105a, the second scan line driver circuit 50105b, and the signal line driver circuit 50106 may be formed in a driver IC 50602a, a driver IC 50602b, and a driver IC 50601, respectively, and are mounted on the liquid crystal panel by COG or the like. In addition, by forming the driver circuits corresponding to the first scan line driver circuit 50105a, the second scan line driver circuit 50105b, and the signal line driver circuit 50106 in the driver IC 50602a, the driver IC 50602b, and the driver IC 50601, respectively, cost can be reduced.

This embodiment can be combined with any of the other embodiments as appropriate. That is, as described in Embodiment 1, a display device can be provided in which whether to correct realistic moving images with a high dynamic range can be selectively switched in accordance with the strength and weakness of blinking of light. Therefore, a display device can be provided in which the high image quality of moving images can be kept while relieving an adverse effect of large blinking of light as compared to processing by which an adverse effect of large blinking of light is relieved by simply lowering the brightness of the entire screen. Further, in the structure described in this embodiment, correction by which the range between the upper limit and the lower limit of a gray level is narrowed is performed. With correction for narrowing a dynamic range by gamma correction with a gamma correction table stored in a correction memory or tone curve correction, a display device can be provided in which large blinking of light can be relieved, so that eyestrain or unwellness can be reduced.

Embodiment 4

In this embodiment, a method for manufacturing a transistor when a top-gate transistor is formed by using a semiconductor film which is transferred from a semiconductor substrate (a bond substrate) to a support substrate (a base substrate) as the semiconductor film described in Embodiment 3 is described.

Figure 17A:
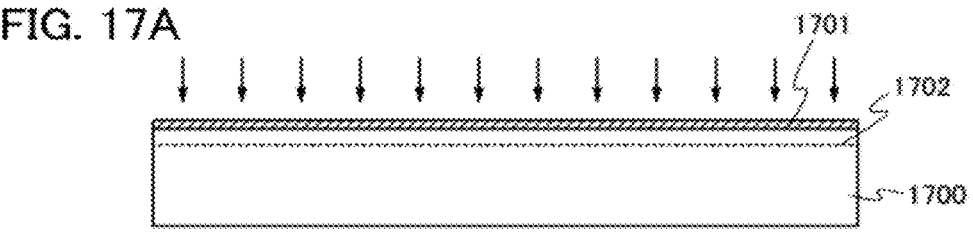
FIGS. 17A to 17D illustrate Embodiment 4.

First, as illustrated in FIG. 17A, an insulating film 1701 is formed over a bond substrate 1700. The insulating film 1701 is formed using an insulating material such as silicon oxide, silicon oxynitride, silicon nitride oxide, or silicon nitride. The insulating film 1701 may be formed using a single insulating film or by stacking a plurality of insulating films. For example, in this embodiment, the insulating film 1701 is formed by stacking silicon oxynitride containing more oxygen than nitrogen and silicon nitride oxide containing more nitrogen than oxygen in that order from a bond substrate 1700 side.

For example, in the case of using silicon oxide for the insulating film 1701, the insulating film 1701 can be formed using a mixed gas of silane and oxygen, a mixed gas of tetraethoxysilane (TEOS) and oxygen, or the like by vapor deposition such as thermal CVD, plasma-enhanced CVD, atmospheric pressure CVD, or bias ECRCVD. In this case, a surface of the insulating film 1701 may be densified by oxygen plasma treatment. Alternatively, in the case of using silicon nitride for the insulating film 1701, the insulating film 1701 can be formed using a mixed gas of silane and ammonia by vapor deposition such as plasma-enhanced CVD. Alternatively, in the case of using silicon nitride oxide for the insulating film 1701, the insulating film 1701 can be formed using a mixed gas of silane and ammonia or a mixed gas of silane and nitrogen oxide by vapor deposition such as plasma-enhanced CVD.

Alternatively, silicon oxide formed using an organosilane gas by chemical vapor deposition may be used for the insulating film 1701. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used.

Next, as illustrated in FIG. 17A, hydrogen or a rare gas, or hydrogen ions or rare gas ions are introduced into the bond substrate 1700 as indicated by arrows, so that a defect layer 1702 having microvoids is formed at a given depth from a surface of the bond substrate 1700. The position where the defect layer 1702 is formed is determined by accelerating voltage at the time of the introduction. Since the thickness of a semiconductor film 1708 which is transferred from the bond substrate 1700 to the base substrate 1704 is determined by the position of the defect layer 1702, the accelerating voltage at the time of the introduction is set taking the thickness of the semiconductor film 1708 into consideration. The thickness of the semiconductor film 1708 is 10 to 200 nm, preferably 10 to 50 nm. For example, when hydrogen is introduced into the bond substrate 1700, the dosage is preferably $3\times10^{16}$ to $1\times10^{17}/cm^2$.

Note that since hydrogen or a rare gas, or hydrogen ions or rare gas ions are introduced into the bond substrate 1700 at a high concentration in the step of forming the defect layer 1702, the surface of the bond substrate 1700 becomes rough and sufficient strength for attaching the base substrate 1704 and the bond substrate 1700 to each other cannot be obtained in some cases. By providing the insulating film 1701, the surface of the bond substrate 1700 is protected when hydrogen or a rare gas, or hydrogen ions or rare gas ions are introduced into the bond substrate 1700, so that the base substrate 1704 and the bond substrate 1700 can be attached to each other favorably.

Figure 17B:
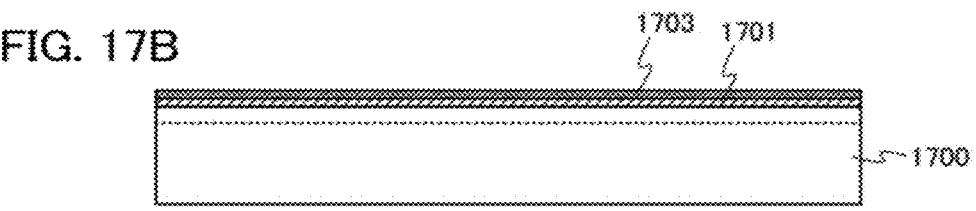

Next, as illustrated in FIG. 17B, an insulating film 1703 is formed over the insulating film 1701. In a manner similar to that of the insulating film 1701, the insulating film 1703 is formed using an insulating material such as silicon oxide, silicon oxynitride, silicon nitride oxide, or silicon nitride. The insulating film 1703 can be formed using a single insulating film or by stacking a plurality of insulating films. Further, silicon oxide formed using an organosilane gas by chemical vapor deposition may be used for the insulating film 1703. In this embodiment, silicon oxide formed using an organosilane gas by chemical vapor deposition is used for the insulating film 1703.

Note that by using an insulating film having a high barrier property, such as a silicon nitride film or a silicon nitride oxide film, as the insulating film 1701 or the insulating film 1703, impurities such as an alkali metal or an alkaline earth metal can be prevented from entering an island-shaped semiconductor film 1709 which is to be formed later, from the base substrate 1704.

Note that although the insulating film 1703 is formed after the defect layer 1702 is formed in this embodiment, the insulating film 1703 is not necessarily provided. Note that since the insulating film 1703 is formed after the defect layer 1702 is formed, the insulating film 1703 has a flatter surface than the insulating film 1701 formed before the defect layer 1702 is formed. Thus, by providing the insulating film 1703, the strength of attachment which is to be performed later can be further increased.

Next, before the bond substrate 1700 and the base substrate 1704 are attached to each other, hydrogenation may be performed on the bond substrate 1700. Hydrogenation is performed, for example, at 350° C. for about 2 hours in a hydrogen atmosphere.

Figure 17C:
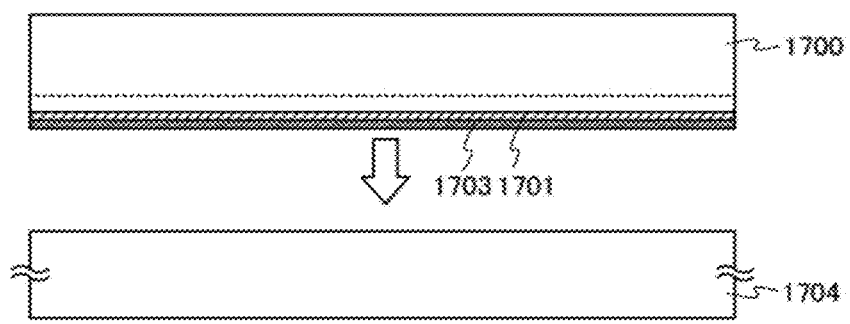
Figure 17D:
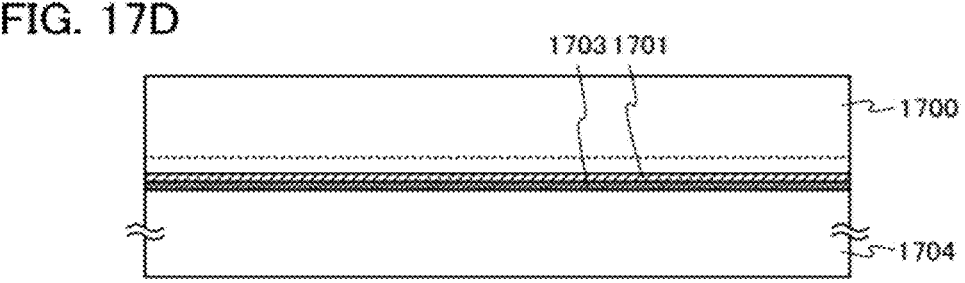

Next, as illustrated in FIG. 17C, the bond substrate 1700 is stacked over the base substrate 1704 so that the insulating film 1703 is interposed therebetween. Then, the bond substrate 1700 and the base substrate 1704 are attached to each other, as illustrated in FIG. 17D. The insulating film 1703 is attached to the base substrate 1704, so that the bond substrate 1700 and the base substrate 1704 can be attached to each other.

Since the bond substrate 1700 and the base substrate 1704 are attached to each other by van der Waals force, the substrates are firmly attached to each other even at room temperature. Note that since the attachment can be performed at low temperature, a variety of substrates can be used as the base substrate 1704. For example, as well as a glass substrate such as an aluminosilicate glass substrate, a barium borosilicate glass substrate, or an aluminoborosilicate glass substrate, a substrate such as a quartz substrate or a sapphire substrate can be used as the base substrate 1704. Alternatively, a semiconductor substrate formed using silicon, gallium arsenide, indium phosphide, or the like can be used as the base substrate 1704.

Note that an insulating film may also be formed over a surface of the base substrate 1704 and the insulating film may be attached to the insulating film 1703. In this case, as well as the above substrates, a metal substrate such as a stainless steel substrate can be used as the base substrate 1704. There is a tendency that a flexible substrate formed using a synthetic resin such as plastics generally has a lower allowable temperature limit than the above substrates; however, such a substrate can be used as the base substrate 1704 as long as it can withstand processing temperature in manufacturing steps. For a plastic substrate, polyester typified by polyethylene terephthalate (PET), polyethersulfone (PES), polyethylene naphthalate (PEN), polycarbonate (PC), polyetheretherketone (PEEK), polysulfone (PSF), polyetherimide (PEI), polyarylate (PAR), polybutylene terephthalate (PBT), polyimide, an acrylonitrile butadiene styrene resin, polyvinyl chloride, polypropylene, polyvinyl acetate, an acrylic resin, or the like can be used.

A single crystal semiconductor substrate or a polycrystalline semiconductor substrate formed using silicon, germanium, or the like can be used as the bond substrate 1700. Alternatively, a single crystal semiconductor substrate or a polycrystalline semiconductor substrate formed using a compound semiconductor such as gallium arsenide or indium phosphide can be used as the bond substrate 1700. Alternatively, a semiconductor substrate formed using silicon having lattice distortion, silicon germanium in which germanium is added to silicon, or the like may be used as the bond substrate 1700. Silicon having lattice distortion can be formed by being deposited over silicon germanium or silicon nitride, which has a larger lattice constant than silicon.

Note that heat treatment or pressure treatment may be performed after the base substrate 1704 and the bond substrate 1700 are attached to each other. By performing heat treatment or pressure treatment, the attachment strength can be increased.

Figure 18A:
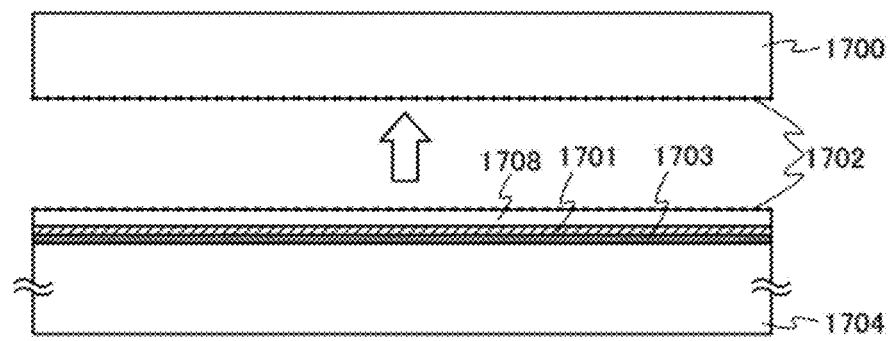
FIGS. 18A to 18C illustrate Embodiment 4.

By performing heat treatment after the attachment is performed, adjacent microvoids in the defect layer 1702 are combined with each other and the volume of the microvoids is increased. Accordingly, as illustrated in FIG. 18A, the bond substrate 1700 is cleaved along the defect layer 1702, so that the semiconductor film 1708 which is part of the bond substrate 1700 is separated. The heat treatment is preferably performed at a temperature which is lower than or equal to the allowable temperature limit of the base substrate 1704. For example, the heat treatment is performed at temperatures ranging from 400 to 600° C. With this separation, the semiconductor film 1708 is transferred together with the insulating film 1701 and the insulating film 1703 to the base substrate 1704. After that, heat treatment at temperatures ranging from 400 to 600° C. is preferably performed in order that the insulating film 1703 and the base substrate 1704 are attached to each other more firmly.

The crystalline orientation of the semiconductor film 1708 can be controlled by the plane orientation of the bond substrate 1700. The bond substrate 1700 having crystalline orientation which is suitable for a semiconductor element which is to be formed may be selected as appropriate. Further, the mobility of a transistor differs depending on the crystalline orientation of the semiconductor film 1708. When a transistor having higher mobility is desired to be obtained, the direction of the attachment of the bond substrate 1700 is set taking the direction of a channel and the crystalline orientation into consideration.

Next, a surface of the transferred semiconductor film 1708 is flattened. Although flattening is not necessarily performed, by performing flattening, characteristics of an interface between the semiconductor film 1708 and a gate insulating film in a transistor which is to be formed later can be improved. Specifically, flattening can be performed by chemical mechanical polishing (CMP). The thickness of the semiconductor film 1708 is decreased by the flattening.

Note that although the case where Smart Cut (registered trademark) is used by which the semiconductor film 1708 is separated from the bond substrate 1700 by forming the defect layer 1702 is described in this embodiment, the semiconductor film 1708 may be attached to the base substrate 1704 by a different attachment method such as epitaxial layer transfer (ELTRAN), a dielectric separation method, or plasma assisted chemical etching (PACE).

Figure 18B:
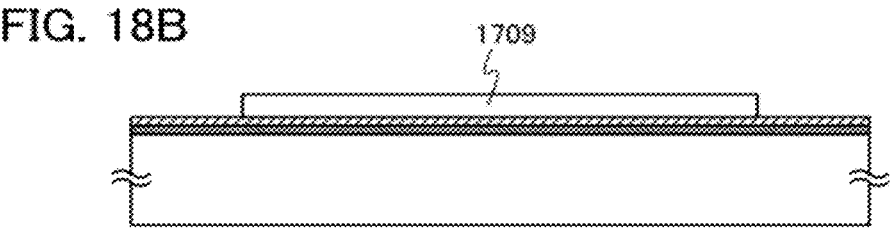

Next, as illustrated in FIG. 18B, by processing (patterning) the semiconductor film 1708 into a desired shape, the island-shaped semiconductor film 1709 is formed.

Figure 18C:
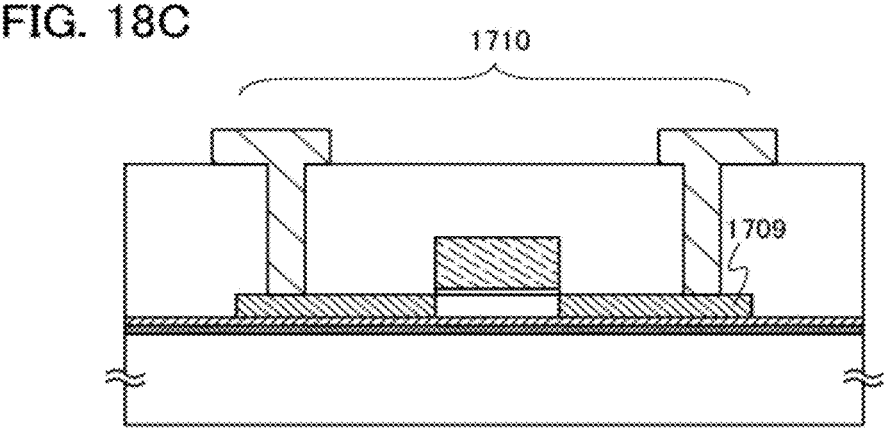

A variety of semiconductor elements such as transistors can be formed using the island-shaped semiconductor film 1709 formed through the above step. In FIG. 18C, a transistor 1710 formed using the semiconductor film 1709 is illustrated.

By using the above manufacturing method, a semiconductor element with excellent characteristics can be manufactured.

This embodiment can be combined with any of the other embodiments as appropriate. That is, as described in Embodiment 1, a display device can be provided in which whether to correct realistic moving images with a high dynamic range can be selectively switched in accordance with the strength and weakness of blinking of light. Therefore, a display device can be provided in which the high image quality of moving images can be kept while relieving an adverse effect of large blinking of light as compared to processing by which an adverse effect of large blinking of light is relieved by simply lowering the brightness of the entire screen. Further, in the structure described in this embodiment, correction by which the range between the upper limit and the lower limit of a gray level is narrowed is performed. With correction for narrowing a dynamic range by gamma correction with a gamma correction table stored in a correction memory or tone curve correction, a display device can be provided in which large blinking of light can be relieved, so that eyestrain or unwellness can be reduced.

Embodiment 5

In this embodiment, a method for manufacturing a transistor when a bottom-gate transistor is formed by using a semiconductor film formed using an oxide semiconductor as the semiconductor film described in Embodiment 3 is described.

Figure 19A:
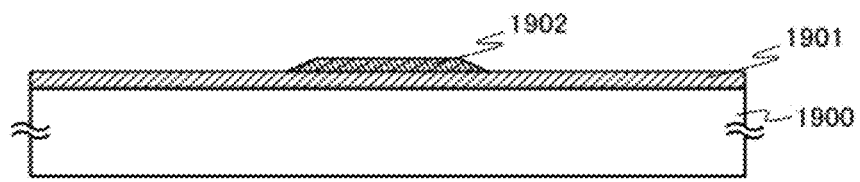
FIGS. 19A to 19D illustrate Embodiment 5.

First, as illustrated in FIG. 19A, an insulating film 1901 is formed over a substrate 1900. The insulating film 1901 is formed using an insulating material such as silicon oxide, silicon oxynitride, silicon nitride oxide, or silicon nitride. The insulating film 1901 may be formed using a single insulating film or by stacking a plurality of insulating films. For example, in this embodiment, a silicon oxide film is used as the insulating film 1901.

A glass substrate such as a barium borosilicate glass substrate or an aluminoborosilicate glass substrate, a quartz substrate, a ceramic substrate, or the like can be used as the substrate 1900. Alternatively, a metal substrate such as a stainless steel substrate or a semiconductor substrate such as a silicon substrate may be used. There is a tendency that a flexible substrate formed using a synthetic resin such as plastics generally has a lower allowable temperature limit than the above substrates; however, such a substrate can be used as long as it can withstand processing temperature in manufacturing steps.

For a plastic substrate, polyester typified by polyethylene terephthalate (PET), polyethersulfone (PES), polyethylene naphthalate (PEN), polycarbonate (PC), polyetheretherketone (PEEK), polysulfone (PSF), polyetherimide (PEI), polyarylate (PAR), polybutylene terephthalate (PBT), polyimide, an acrylonitrile butadiene styrene resin, polyvinyl chloride, polypropylene, polyvinyl acetate, an acrylic resin, or the like can be used.

In the case of using silicon oxide for the insulating film 1901, the insulating film 1901 can be formed using a mixed gas of silane and oxygen, a mixed gas of tetraethoxysilane (TEOS) and oxygen, or the like by vapor deposition such as thermal CVD, plasma-enhanced CVD, atmospheric pressure CVD, or bias ECRCVD.

Alternatively, silicon oxide formed using an organosilane gas by chemical vapor deposition may be used for the insulating film 1901. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$) can be used.

Next, as illustrated in FIG. 19A, after a conductive film is formed over the insulating film 1901, the conductive film is processed into a predetermined shape so that a first conductive film 1902 is formed. For the first conductive film 1902, tantalum (Ta), tungsten (W), titanium (Ti), molybdenum (Mo), aluminum (Al), copper (Cu), chromium (Cr), neodymium (Nd), or the like can be used. Alternatively, either an alloy containing any of the above metals as its main component or a compound containing any of the above metals may be used. Alternatively, the first conductive film 1902 may be formed using a semiconductor such as polycrystalline silicon, in which a semiconductor film is doped with an impurity element such as phosphorus, which imparts conductivity. For example, in this embodiment, an alloy of tungsten and molybdenum is used for the first conductive film 1902.

Figure 19B:
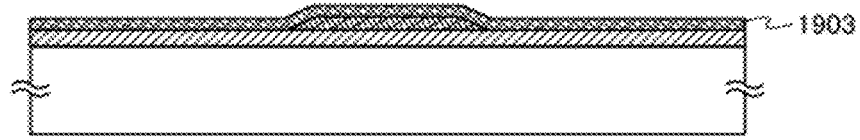

Next, as illustrated in FIG. 19B, a gate insulating film 1903 is formed so as to cover the first conductive film 1902. The gate insulating film 1903 can be formed using a single-layer structure or a layered structure of a film containing silicon oxide, silicon nitride (e.g., $SiN_x$ or $Si_3N_4$), silicon oxynitride ($SiO_xN_y$) (x>y>0), silicon nitride oxide ($SiN_xO_y$) (x>y>0), or the like, by plasma-enhanced CVD, sputtering, or the like. For example, in this embodiment, silicon nitride is used for the gate insulating film 1903.

Figure 19C:
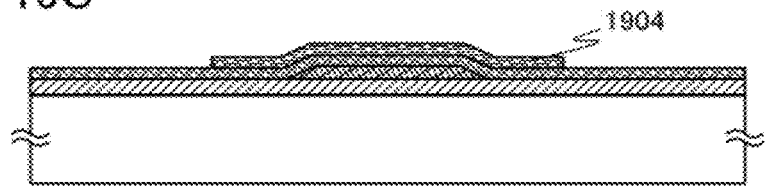

Next, as illustrated in FIG. 19C, after an oxide semiconductor film is formed over the gate insulating film 1903, the oxide semiconductor film is processed into a predetermined shape so that an oxide semiconductor film 1904 is formed. The thickness of the oxide semiconductor film 1904 is 5 to 200 nm (preferably 10 to 120 nm, more preferably 15 to 70 nm). Note that as an oxide semiconductor, for example, zinc oxide (ZnO), titanium oxide ($TiO_2$), magnesium zinc oxide ($Mg_xZn_{1-x}O$), cadmium zinc oxide ($Cd_xZn_{1-x}O$), cadmium oxide (CdO), an In—Ga—Zn—O-based amorphous oxide semiconductor (a-IGZO), or the like is used. For example, in this embodiment, a-IGZO is formed by sputtering by using $In_2$—$Ga_2$—$ZnO_7$ as a target and is used for the oxide semiconductor film 1904.

Figure 19D:
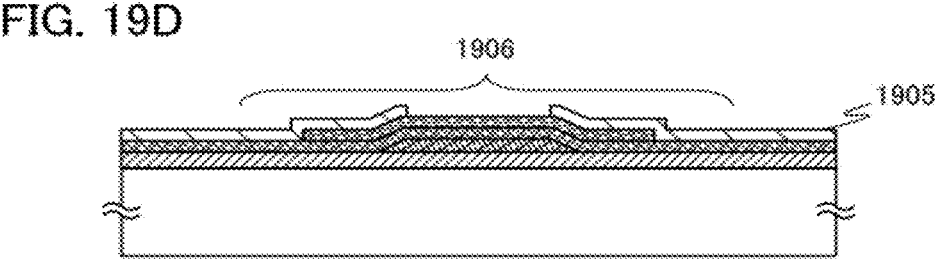

Next, as illustrated in FIG. 19D, after a conductive film is formed over the gate insulating film 1903 and the oxide semiconductor film 1904, the conductive film is processed into a predetermined shape so that a second conductive film 1905 is formed. For the second conductive film 1905, tantalum (Ta), tungsten (W), titanium (Ti), molybdenum (Mo), aluminum (Al), copper (Cu), chromium (Cr), neodymium (Nd), or the like can be used. Alternatively, either an alloy containing any of the above metals as its main component or a compound containing any of the above metals may be used. Alternatively, the second conductive film 1905 may be formed using a semiconductor such as polycrystalline silicon, in which a semiconductor film is doped with an impurity element such as phosphorus, which imparts conductivity. For example, in this embodiment, an alloy of tungsten and molybdenum is used for the second conductive film 1905. Note that when the second conductive film 1905 is processed, a protective film may be provided over the oxide semiconductor film 1904. As the protective film, a silicon oxide film may be used.

A variety of semiconductor elements such as transistors can be formed using the oxide semiconductor film formed through the above step. In FIG. 19D, a transistor 1906 formed using the semiconductor film 1904 is illustrated.

By using the above manufacturing method, a semiconductor element with excellent characteristics can be manufactured.

This embodiment can be combined with any of the other embodiments as appropriate. That is, as described in Embodiment 1, a display device can be provided in which whether to correct realistic moving images with a high dynamic range can be selectively switched in accordance with the strength and weakness of blinking of light. Therefore, a display device can be provided in which the high image quality of moving images can be kept while relieving an adverse effect of large blinking of light as compared to processing by which an adverse effect of large blinking of light is relieved by simply lowering the brightness of the entire screen. Further, in the structure described in this embodiment, correction by which the range between the upper limit and the lower limit of a gray level is narrowed is performed. With correction for narrowing a dynamic range by gamma correction with a gamma correction table stored in a correction memory or tone curve correction, a display device can be provided in which large blinking of light can be relieved, so that eyestrain or unwellness can be reduced.

Embodiment 6

In this embodiment, a method for manufacturing a transistor when a bottom-gate transistor is formed by using a semiconductor film formed using a microcrystalline semiconductor as the semiconductor film described in Embodiment 3 is described.

An n-channel transistor including a microcrystalline semiconductor for a semiconductor film is more suitable for use in a driver circuit than a p-channel transistor including a microcrystalline semiconductor for a semiconductor film because the n-channel transistor has higher mobility. It is preferable that all thin film transistors formed over the same substrate have the same polarity in order to reduce the number of steps. Here, the n-channel thin film transistor is described.

Figure 20A:
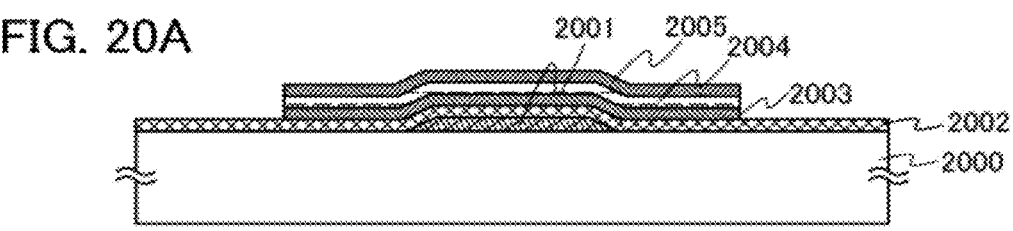
FIGS. 20A to 20D illustrate Embodiment 6.

Next, as illustrated in FIG. 20A, after a conductive film is formed over a substrate 2000, the conductive film is processed into a predetermined shape so that a first conductive film 2001 is formed. The first conductive film 2001 may be formed using a known metal material such as titanium, molybdenum, chromium, tantalum, tungsten, or aluminum; however, it is preferable that the first conductive film 2001 be processed into a predetermined shape by using a conductive paste including a metal material by a screen printing method or a roll coater method. After the first conductive film 2001 is processed into the predetermined shape by using the conductive paste, the first conductive film 2001 is dried and then cured at 100 to 200° C. to have a thickness ranging from 1 to 5 μm. The first conductive film 2001 functions as a gate electrode.

A glass substrate such as a barium borosilicate glass substrate or an aluminoborosilicate glass substrate, a quartz substrate, a ceramic substrate, or the like can be used as the substrate 2000. Alternatively, a metal substrate such as a stainless steel substrate or a semiconductor substrate such as a silicon substrate may be used. There is a tendency that a flexible substrate formed using a synthetic resin such as plastics generally has a lower allowable temperature limit than the above substrates; however, such a substrate can be used as long as it can withstand processing temperature in manufacturing steps For a plastic substrate, polyester typified by polyethylene terephthalate (PET), polyethersulfone (PES), polyethylene naphthalate (PEN), polycarbonate (PC), polyetheretherketone (PEEK), polysulfone (PSF), polyetherimide (PEI), polyarylate (PAR), polybutylene terephthalate (PBT), polyimide, an acrylonitrile butadiene styrene resin, polyvinyl chloride, polypropylene, polyvinyl acetate, an acrylic resin, or the like can be used.

Next, as illustrated in FIG. 20A, a gate insulating film 2002 is formed over the first conductive film 2001. Then, a microcrystalline semiconductor film, a buffer layer, and a semiconductor film to which an impurity which imparts one conductivity type is added are sequentially formed over the gate insulating film 2002 and are processed into a predetermined shape so that a microcrystalline semiconductor film 2003, a buffer layer 2004, and a semiconductor film 2005 to which an impurity which imparts one conductivity type is added are formed. By successive formation of the gate insulating film 2002, the microcrystalline semiconductor film 2003, and the buffer layer 2004 without exposure to the atmosphere, each interface between stacked layers can be formed without being contaminated by an atmospheric constituent or a contaminant impurity element floating in the atmosphere. Thus, variations in characteristics of thin film transistors can be reduced.

An organic insulating material to which an acrylic resin, a polyimide resin, a polyamide resin, a phenoxy resin, nonaromatic multifunctional isocyanate, a melamine resin, or the like is added can be used for the gate insulating film 2002, and the gate insulating film 2002 can be formed to a thickness ranging from 0.1 to 3 μm. Note that the material of the gate insulating film 2002 is not necessarily limited to the organic insulating material, and a silicon oxide film formed by an application method may be used. Alternatively, a silicon oxide film, a silicon nitride film, a silicon oxynitride film, or a silicon nitride oxide film can be formed by CVD, sputtering, or the like in the range of temperature at which the flexible substrate can withstand (200 to 300° C.).

Here, a silicon oxynitride film refers to a film which contains much oxygen than nitrogen, and in the case where measurement is performed using Rutherford backscattering spectrometry (RBS) and hydrogen forward scattering (HFS), contains oxygen, nitrogen, silicon, and hydrogen at concentrations ranging from 55 to 70 atomic percent, 0.5 to 15 atomic percent, 25 to 35 atomic percent, and 0.1 to 10 atomic percent, respectively. Further, a silicon nitride oxide film refers to a film which contains much nitrogen than oxygen and contains oxygen, nitrogen, silicon, and hydrogen at concentrations ranging from 5 to 30 atomic percent, 20 to 55 atomic percent, 25 to 35 atomic percent, and 10 to 30 atomic percent, respectively. Note that percentages of nitrogen, oxygen, silicon, and hydrogen fall within the ranges given above if the total number of atoms contained in silicon oxynitride or silicon nitride oxide is defined as 100 atomic percent.

The microcrystalline semiconductor film 2003 is a film having an intermediate structure between amorphous and crystalline structures (including single crystal and polycrystalline). The semiconductor is a semiconductor which has a third state which is stable in terms of free energy, is a crystalline semiconductor which has a short-range order and lattice distortion, and can be dispersed in a non-single-crystal semiconductor, with a grain size ranging from 0.5 to 20 nm. Microcrystalline silicon, which is a typical example of a microcrystalline semiconductor, has a Raman spectrum which is shifted to a wave number side lower than 520.6 cm$^{-1}$ that represents single-crystal silicon. That is, the peak of a Raman spectrum of microcrystalline silicon is in the range of 481 cm$^{-1}$ to 520.6 cm$^{-1}$. In addition, microcrystalline silicon contains hydrogen or halogen of at least 1 atomic percent or more in order to terminate a dangling bond. Moreover, microcrystalline silicon contains a rare gas element such as helium, argon, krypton, or neon to further promote lattice distortion, so that stability is increased and a favorable microcrystalline semiconductor can be obtained. Such a microcrystalline semiconductor film is disclosed in, for example, U.S. Pat. No. 4,409,134.

The microcrystalline semiconductor can be formed at a deposition temperature of approximately 150 to 300° C. by high-frequency plasma-enhanced CVD with a frequency of several tens to several hundreds of megahertz or microwave plasma-enhanced CVD with a frequency higher than or equal to 1 GHz and is preferably used when a flexible substrate whose upper temperature limit is approximately 200 to 300° C. is used. Typically, the microcrystalline semiconductor film can be formed using a dilution of silicon hydride such as $SiH_4$ or $Si_2H_6$ with hydrogen. With a dilution with one or a plural kinds of rare gas elements selected from helium, argon, krypton, or neon in addition to silicon hydride and hydrogen, the microcrystalline semiconductor can be formed. In that case, the flow ratio of hydrogen to silicon hydride is 5:1 to 200:1, preferably 50:1 to 150:1, more preferably 100:1. Note that instead of silicon hydride, $SiH_2Cl_2$, $SiHCl_3$, $SiCl_4$, $SiF_4$, or the like can be used.

The microcrystalline semiconductor film 2003 exhibits weak n-type conductivity when an impurity element for valence control is not intentionally added. Thus, the threshold voltage can be controlled by adding an impurity element which imparts p-type conductivity to the microcrystalline semiconductor film which functions as a channel formation region of a thin film transistor at the same time as or after deposition. A typical example of an impurity element which imparts p-type conductivity is boron, and an impurity gas such as $B_2H_6$ or $BF_3$ may be mixed in silicon hydride at a proportion of 1 to 1000 ppm, preferably 1 to 100 ppm. The concentration of boron may be, for example, $1\times10^{14}$ to $6\times10^{16}$ atoms/cm$^3$.

In addition, the oxygen concentration of the microcrystalline semiconductor film is preferably $1\times10^{19}$ cm$^{-3}$ or less, more preferably $5\times10^{18}$ cm$^{-3}$ or less and each of the nitrogen concentration and the carbon concentration is preferably $5\times10^{18}$ cm$^{-3}$ or less, more preferably $1\times10^{18}$ cm$^{-3}$ or less. When concentrations of oxygen, nitrogen, and carbon to be mixed in the microcrystalline semiconductor film are decreased, the microcrystalline semiconductor film can be prevented from being changed into an n-type semiconductor film.

The microcrystalline semiconductor film 2003 is formed to a thickness greater than 0 nm and less than or equal to 200 nm, preferably greater than or equal to 1 nm and less than or equal to 100 nm, more preferably greater than or equal to 5 nm and less than or equal to 50 nm. The microcrystalline semiconductor film 2003 functions as a channel formation region of a thin film transistor which is to be formed later. When the thickness of the microcrystalline semiconductor film 2003 is within a range of 5 to 50 nm, the thin film transistor which is to be formed later is made a fully-depleted type. In addition, since the deposition rate of the microcrystalline semiconductor film 2003 is low, i.e., a tenth to a hundredth of the deposition rate of an amorphous semiconductor film, throughput can be improved when the microcrystalline semiconductor film is formed thin. Further, since the microcrystalline semiconductor film contains microcrystals, fluctuation in the threshold voltage of the thin film transistor can be suppressed when an amorphous semiconductor film is used.

A microcrystalline semiconductor has higher mobility than an amorphous semiconductor. That is, a semiconductor film having high electric characteristics can be obtained without performing crystallization treatment at a high temperature of approximately 600° C. like the case of a polycrystalline semiconductor film. Thus, a thin film transistor using the microcrystalline semiconductor film is suitable for the switching of an electrophoretic display element formed over a flexible substrate. By using a thin film transistor whose channel formation region is formed using a microcrystalline semiconductor film, the area of the channel formation region, i.e., the area of the thin film transistor can be decreased.

The buffer layer 2004 can be formed using silicon hydride such as $SiH_4$ or $Si_2H_6$ by plasma-enhanced CVD. Note that in a manner similar to that of the microcrystalline semiconductor film, the buffer layer 2004 can be formed at a deposition temperature of approximately 150 to 300° C. Alternatively, with a dilution of silicon hydride described above with one or plural kinds of rare gas elements selected from helium, argon, krypton, or neon, an amorphous semiconductor film can be formed. When hydrogen at a flow rate which is 1 to 20 times, preferably 1 to 10 times, more preferably 1 to 5 times higher than that of silicon hydride is used, a hydrogen-containing amorphous semiconductor film can be formed. Alternatively, when silicon hydride described above and nitrogen or ammonia are used, a nitrogen-containing amorphous semiconductor film can be formed. Alternatively, when silicon hydride described above and a gas containing fluorine, chlorine, bromine, or iodine (e.g., $F_2$, $Cl_2$, $Br_2$, $I_2$, HF, HCl, HBr, or HI) are used, an amorphous semiconductor film containing fluorine, chlorine, bromine, or iodine can be formed. Note that instead of silicon hydride, $SiH_2Cl_2$, $SiHCl_3$, $SiCl_4$, $SiF_4$, or the like can be used.

Alternatively, for the buffer layer 2004, an amorphous semiconductor can be formed by sputtering by using an amorphous semiconductor as a target with hydrogen or a rare gas. In this case, when ammonia, nitrogen, or $N_2O$ is contained in an atmosphere, a nitrogen-containing amorphous semiconductor film can be formed. Alternatively, when a gas including fluorine, chlorine, bromine, or iodine (e.g., $F_2$, $Cl_2$, $Br_2$, $I_2$, HF, HCl, HBr, or HI) is contained in an atmosphere, an amorphous semiconductor containing fluorine, chlorine, bromine, or iodine can be formed.

Alternatively, after an amorphous semiconductor film is formed on a surface of the microcrystalline semiconductor film 2003 as the buffer layer 2004 by plasma-enhanced CVD or sputtering, hydrogenation, nitriding, or halogenation of a surface of the amorphous semiconductor film may be performed through processing of the surface of the amorphous semiconductor film with hydrogen plasma, nitrogen plasma, or halogen plasma. Alternatively, the surface of the amorphous semiconductor film may be processed with helium plasma, neon plasma, argon plasma, krypton plasma, or the like.

The buffer layer 2004 is preferably formed using an amorphous semiconductor film which does not contain crystal grains. Therefore, when the buffer layer 2004 is formed by high-frequency plasma-enhanced CVD with a frequency of several tens to several hundreds of megahertz or microwave plasma-enhanced CVD, deposition conditions are preferably controlled so that the amorphous semiconductor film does not contain crystal grains.

Part of the buffer layer 2004 is etched in a later step of forming a source region and a drain region in some cases, and the buffer layer 2004 is preferably formed to a thickness such that part of the buffer layer 2004 remains in that case. Typically, part of the buffer layer 2004, which remains after the etching, is preferably formed to a thickness greater than or equal to 10 nm and less than or equal to 100 nm.

Note that it is preferable that an impurity which imparts one conductivity type such as phosphorus or boron be not added to the buffer layer 2004. In particular, it is preferable that boron contained in the microcrystalline semiconductor film for controlling the threshold voltage or phosphorus contained in the semiconductor film to which an impurity which imparts one conductivity type is added be not mixed in the buffer layer 2004. Accordingly, by eliminating a region where leakage current is generated due to a PN junction, the amount of leakage current can be reduced. By forming an amorphous semiconductor film to which an impurity which imparts one conductivity type, such as phosphorus or boron, is not added, between the semiconductor film to which an impurity which imparts one conductivity type is added and the microcrystalline semiconductor film, the impurity contained in each of the microcrystalline semiconductor film, a source region, and a drain region can be prevented from diffusing.

When an amorphous semiconductor film or an amorphous semiconductor film containing hydrogen, nitrogen, or halogen is formed on the surface of the microcrystalline semiconductor film 2003, native oxidation of surfaces of crystal grains contained in the microcrystalline semiconductor film 2003 can be prevented. In particular, in a region where an amorphous semiconductor is in contact with microcrystal grains, a crack is easily generated due to distortion of a crystal lattice. When this crack is exposed to oxygen, the microcrystal grains are oxidized, so that silicon oxide is formed. However, when the buffer layer is formed on the surface of the microcrystalline semiconductor film 2003, microcrystal grains can be prevented from being oxidized. Further, when the buffer layer is formed, an etching residue which is generated in forming a source region and a drain region later can be prevented from being mixed in the microcrystalline semiconductor film.

The buffer layer 2004 is formed using an amorphous semiconductor film or an amorphous semiconductor film containing hydrogen, nitrogen, or halogen. An amorphous semiconductor film has a larger energy gap than a microcrystalline semiconductor film (the energy gap of an amorphous semiconductor film is 1.6 to 1.8 eV and the energy gap of a microcrystalline semiconductor is 1.1 to 1.5 eV), has higher resistance, and has lower mobility, i.e., a fifth to a tenth of the mobility of the microcrystalline semiconductor film. Therefore, in a thin film transistor which is formed later, the buffer layer 2004 formed between the source region and the drain region, and the microcrystalline semiconductor film functions as a high-resistance region, and the microcrystalline semiconductor film functions as a channel formation region. Therefore, the amount of off-state current of the thin film transistor can be reduced. In the case where the thin film transistor is used as a switching element of an electrophoretic display device, the contrast of the electrophoretic display device can be improved.

Alternatively, in the structure where the microcrystalline semiconductor film 2003 and the buffer layer 2004 are stacked, a semiconductor film including nitrogen or an NH group and having a crystal region in an amorphous structure may be formed instead of the microcrystalline semiconductor film. In the semiconductor film including nitrogen or an NH group and having a crystal region in an amorphous structure, the crystal region contains an inverted conical or pyramidal crystal grain and/or a microcrystal grain with a grain size greater than or equal to 1 nm and less than or equal to 10 nm, preferably greater than or equal to 1 nm and less than or equal to 5 nm. Further, the inverted conical or pyramidal crystal grains and the microcrystal grains are dispersed. Here, an inverted conical or pyramidal shape refers to a three-dimensional shape and is constructed by (i) a base which is constructed by a plurality of planes and (ii) lines linking the periphery of the base and a vertex which is located outside the base, where the vertex exists on a substrate side.

Alternatively, in the structure where the microcrystalline semiconductor film 2003 and the buffer layer 2004 are stacked, the microcrystalline semiconductor film and the buffer layer may be formed using the semiconductor film including nitrogen or an NH group and having a crystal region in an amorphous structure.

In addition, the semiconductor film including nitrogen or an NH group and having a crystal region in an amorphous structure is formed to be the concentration of oxygen low and increased the concentration of nitrogen. By keeping the concentration of oxygen low, defects can be reduced. Further, at an interface (i.e., a grain boundary) of adjacent crystal regions or an interface between a crystal region and an amorphous structure, defect levels are reduced by cross-linking dangling bonds in Si atoms with N atoms in the NH group. Thus, the amount of off-state current can be kept small. Furthermore, in the amorphous structure, since the crystal regions are dispersed and the number of crystal boundaries is reduced, the amount of on-state current can be increased.

As a method for forming a semiconductor film including nitrogen or an NH group and having a crystal region in an amorphous structure, a large amount of nitrogen or ammonia may be contained on a surface of a gate insulating film before the formation of the semiconductor film. For example, after the gate insulating film is formed, a gas containing nitrogen is sprayed on a surface of the gate insulating film so that nitrogen is adsorbed on the surface of the gate insulating film 2002. Alternatively, the surface of the gate insulating film may be exposed to plasma generated by a gas containing nitrogen. Here, as a gas containing nitrogen, a mixed gas of ammonia, nitrogen, and hydrogen, or the like can be used, for example.

Alternatively, as an example of a different formation method, an inner wall of a processing chamber in which a semiconductor layer which contains nitrogen or an NH group and includes a crystal region in an amorphous structure is formed is covered with a film containing nitrogen at high concentration. As a material which contains nitrogen at high concentration, silicon nitride can be used, for example. Further, a gas having an NH bond (typically a mixed gas containing ammonia, nitrogen, and hydrogen, or the like) may be used as a material of silicon nitride so that the gas is adsorbed on a reaction chamber. Note that the film which contains nitrogen at high concentration and covers the inner wall of the processing chamber is preferable because steps can be simplified by forming the film at the same time as a gate insulating layer.

Alternatively, as an example of a different formation method, in a gas used for forming the semiconductor film which contains nitrogen or an NH group and includes a crystal region in an amorphous structure, the concentration of oxygen is kept low and the concentration of nitrogen is increased. Further, it is preferable to use a gas having an NH bond (typically a mixed gas containing ammonia, nitrogen, and hydrogen, or the like).

In the case where an n-channel thin film transistor is formed, phosphorus may be added as a typical impurity element to the semiconductor film 2005 to which an impurity which imparts one conductivity type is added, and an impurity gas such as $PH_3$ may be added to silicon hydride. Alternatively, in the case where a p-channel thin film transistor is formed, boron may be added as a typical impurity element, and an impurity gas such as $B_2H_6$ may be added to silicon hydride. The semiconductor film 2005 to which an impurity which imparts one conductivity type is added can be formed using a microcrystalline semiconductor or an amorphous semiconductor. The semiconductor film 2005 to which an impurity which imparts one conductivity type is added is formed to a thickness greater than or equal to 2 nm and less than or equal to 50 nm. By forming the semiconductor film to which an impurity which imparts one conductivity type is added to a small thickness, throughput can be improved. Note that the semiconductor film 2005 to which an impurity which imparts one conductivity type is added is to be regions which functions as a source region and a drain region of a thin film transistor later.

Figure 20B:
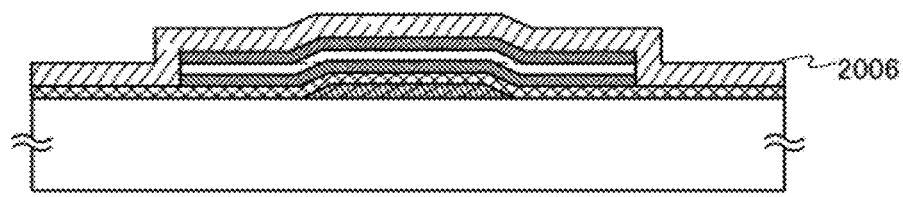

Next, as illustrated in FIG. 20B, a second conductive film 2006 is formed over the gate insulating film 2002 and the semiconductor film 2005 to which an impurity which imparts one conductivity type is added. The second conductive film 2006 is preferably formed having a single-layer structure or a layered structure of aluminum, copper, or an aluminum alloy to which an element for improving heat resistance, such as silicon, titanium, neodymium, scandium, or molybdenum or an element for preventing hillocks is added. Alternatively, the second conductive film 2006 may have a layered structure where a film on a side which is in contact with the semiconductor film to which an impurity which imparts one conductivity type is added is formed using titanium, tantalum, molybdenum, tungsten, or a nitride of any of these elements and aluminum or an aluminum alloy is formed thereover. Alternatively, the second conductive film 2006 may have a layered structure where an upper side and a lower side of aluminum or an aluminum alloy is sandwiched with titanium, tantalum, molybdenum, tungsten, or a nitride of any of these elements.

The second conductive film 2006 is formed by sputtering or vacuum evaporation. Alternatively, the second conductive film 2006 may be formed using a known metal material such as titanium, molybdenum, chromium, tantalum, tungsten, or aluminum; however, the second conductive film 2006 may be formed by using a conductive paste including a metal material by a screen printing method or a roll coater method. Alternatively, the second conductive film 2006 may be formed by discharging a conductive paste to have a desired shape by an inkjet method or the like and baking it.

Figure 20C:
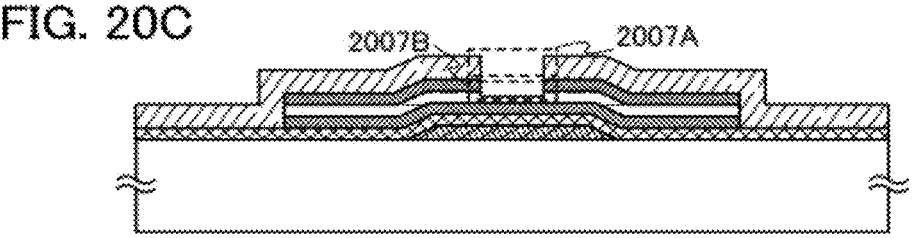

Next, the second conductive film 2006 is partly etched using a mask so as to be separated and is processed as illustrated in FIG. 20C (a processed portion 2007A in FIG. 20C). Subsequently, the semiconductor film 2005 to which an impurity which imparts one conductivity type is added and the buffer layer 2004 are etched using the processed portion 2007A so as to be separated and are processed as illustrated in FIG. 20C (a processed portion 2007B in FIG. 20C). Note that the buffer layer 2004 is etched only partly and covers the surface of the microcrystalline semiconductor film 2003. Next, the second conductive film 2006 is partly etched so that a source electrode and a drain electrode are formed. Further, one of the source electrode and the drain electrode also functions as a source wiring or a drain wiring.

Figure 20D:
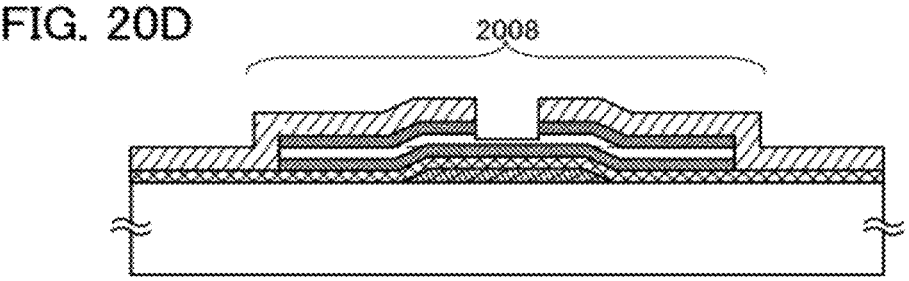

A variety of semiconductor elements such as transistors can be formed using the microcrystalline semiconductor film formed through the above step. In FIG. 20D, a channel-etched transistor 2008 formed using the microcrystalline semiconductor film 2003 is illustrated.

By using the above manufacturing method, a semiconductor element with excellent characteristics can be manufactured.

This embodiment can be combined with any of the other embodiments as appropriate. That is, as described in Embodiment 1, a display device can be provided in which whether to correct realistic moving images with a high dynamic range can be selectively switched in accordance with the strength and weakness of blinking of light. Therefore, a display device can be provided in which the high image quality of moving images can be kept while relieving an adverse effect of large blinking of light as compared to processing by which an adverse effect of large blinking of light is relieved by simply lowering the brightness of the entire screen. Further, in the structure described in this embodiment, correction by which the range between the upper limit and the lower limit of a gray level is narrowed is performed. With correction for narrowing a dynamic range by gamma correction with a gamma correction table stored in a correction memory or tone curve correction, a display device can be provided in which large blinking of light can be relieved, so that eyestrain or unwellness can be reduced.

Embodiment 7

In this embodiment, examples of electronic devices are described.

Figure 15:
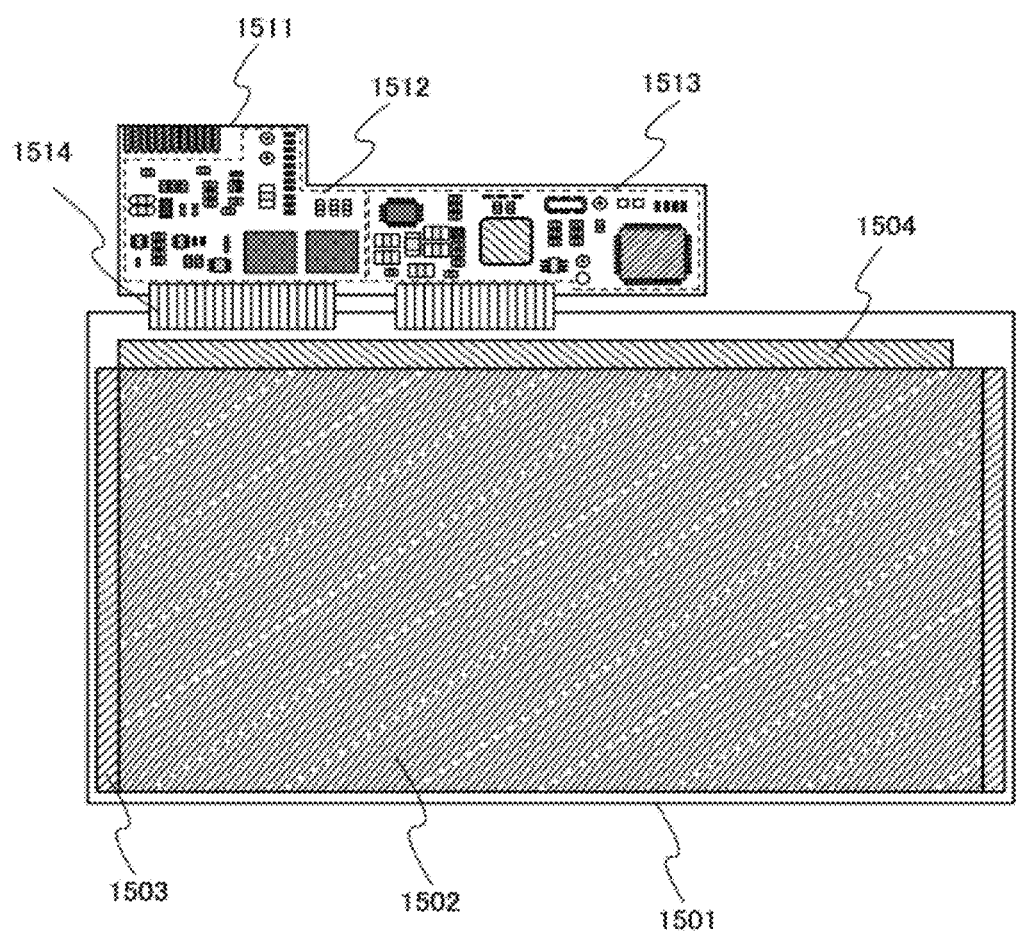
FIG. 15 illustrates Embodiment 7.

FIG. 15 illustrates a display panel module in which a display panel 1501 and a circuit board 1511 are combined with each other. The display panel 1501 includes a pixel portion 1502, a scan line driver circuit 1503, and a signal line driver circuit 1504. The circuit board 1511 includes a control circuit 1512, an arithmetic circuit 1513, and the like, for example. The display panel 1501 and the circuit board 1511 are connected to each other by a connection wiring 1514. An FPC or the like can be used as the connection wiring.

In the display panel 1501, the pixel portion 1502 and part of peripheral driver circuits (a driver circuit whose operation frequency is low among a plurality of driver circuits) may be formed over the same substrate by using transistors, and part of the peripheral driver circuits (a driver circuit whose operation frequency is high among the plurality of driver circuits) may be formed in an IC chip. The IC chip may be mounted on the display panel 1501 by COG (chip on glass) or the like. Thus, the area of the circuit board 1511 can be reduced, so that a smaller display device can be obtained. Alternatively, the IC chip may be mounted on the display panel 1501 by using TAB (tape automated bonding) or a printed wiring board. Thus, the area of the display panel 1501 can be reduced, so that a display device with a narrower frame can be obtained.

For example, in order to reduce power consumption, the pixel portion may be formed over a glass substrate by using transistors and all the peripheral driver circuits may be formed in IC chips. Then, the IC chips may be mounted on the display panel by COG or TAB.

A television receiver can be completed with the display panel module illustrated in FIG. 15.

The content (or part of the content) described in each drawing in this embodiment can be applied to a variety of electronic devices. Specifically, it can be applied to display portions of electronic devices. As such electronic devices, there are cameras such as video cameras and digital cameras, goggle-type displays, navigation systems, audio reproducing devices (e.g., car audio equipment or audio component sets), computers, game machines, portable information terminals (e.g., mobile computers, mobile phones, portable game machines, or e-book readers), image reproducing devices provided with recording media (specifically devices which reproduce the content of recording media such as digital versatile discs (DVDs) and have displays for displaying the reproduced images), and the like.

Figure 16A:
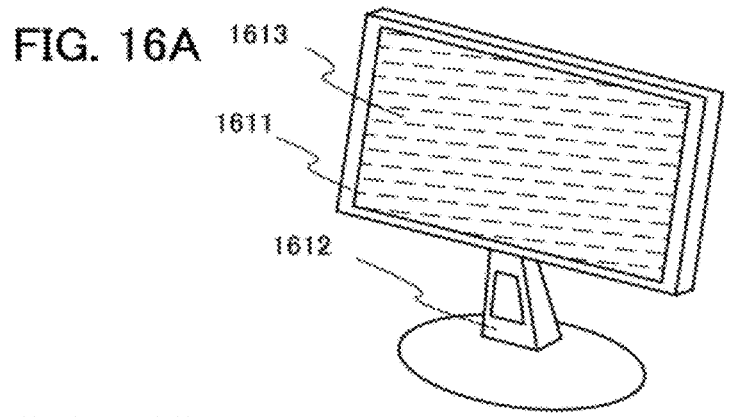
FIGS. 16A to 16C illustrate Embodiment 7.

FIG. 16A is a display, which include a housing 1611, a support base 1612, and a display portion 1613. The display illustrated in FIG. 16A has a function of displaying a variety of information (e.g., still images, moving images, and text images) on the display portion. Note that the display illustrated in FIG. 16A is not limited to having this function. The display illustrated in FIG. 16A can have a variety of functions.

Figure 16B:
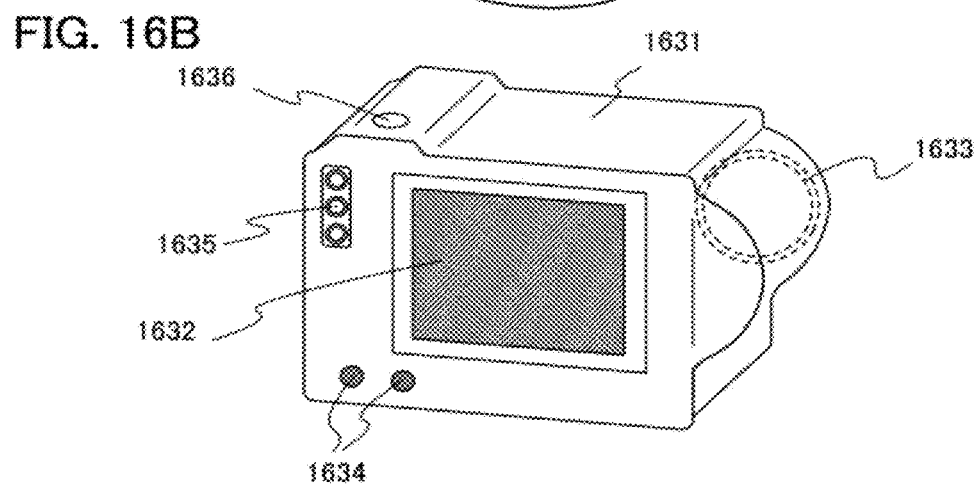

FIG. 16B illustrates a camera, which includes a main body 1631, a display portion 1632, an image receiving portion 1633, operation keys 1634, an external connection port 1635, and a shutter button 1636. The camera illustrated in FIG. 16B has a function of taking still images and a function of taking moving images. Note that the camera illustrated in FIG. 16B is not limited to having these functions. The camera illustrated in FIG. 16B can have a variety of functions.

Figure 16C:
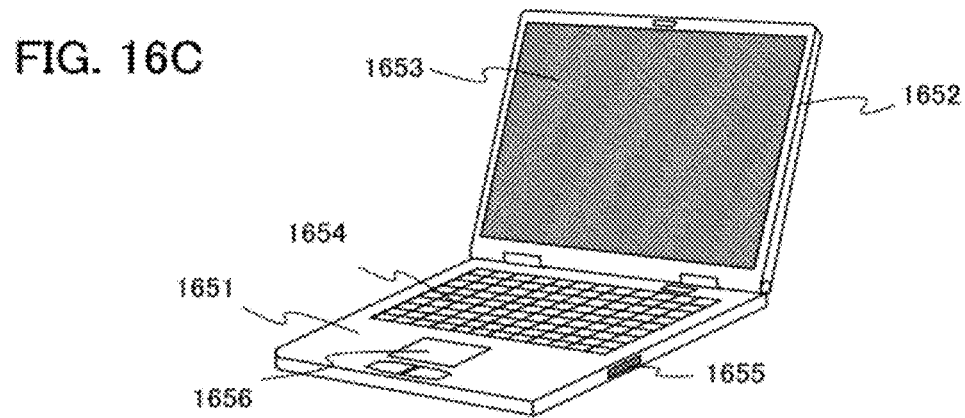

FIG. 16C illustrates a computer, which includes a main body 1651, a housing 1652, a display portion 1653, a keyboard 1654, an external connection port 1655, and a pointing device 1656. The computer illustrated in FIG. 16C has a function of displaying a variety of information (e.g., still images, moving images, and text images) on the display portion. Note that the computer illustrated in FIG. 16C is not limited to having this function. The computer illustrated in FIG. 16C can have a variety of functions.

This embodiment can be combined with any of the other embodiments as appropriate. That is, as described in Embodiment 1, an electronic device can be provided in which whether to correct realistic moving images with a high dynamic range can be selectively switched in accordance with the strength and weakness of blinking of light. Therefore, an electronic device can be provided in which the high image quality of moving images can be kept while relieving an adverse effect of large blinking of light as compared to processing by which an adverse effect of large blinking of light is relieved by simply lowering the brightness of the entire screen. Further, in the structure described in this embodiment, correction by which the range between the upper limit and the lower limit of a gray level is narrowed is performed. With correction for narrowing a dynamic range by gamma correction with a gamma correction table stored in a correction memory or tone curve correction, an electronic device can be provided in which large blinking of light can be relieved, so that eyestrain or unwellness can be reduced.

This application is based on Japanese Patent Application serial no. 2008-165758 filed with Japan Patent Office on Jun. 25, 2008, the entire contents of which are hereby incorporated by reference.

What is claimed is:

1. An image processing system comprising:
a display device for displaying a moving image by using an image divided into a plurality of frames;
an image data storage portion for storing image data of an image of an $n^{th}$ (n is a natural number) frame and image data of an image of an $(n+1)^{th}$ frame;
a histogram conversion portion for calculating a histogram of the $n^{th}$ frame and a histogram of the $(n+1)^{th}$ frame in accordance with the image data stored in the image data storage portion;
a histogram comparator portion for calculating a difference between the histogram of the $n^{th}$ frame and the histogram of the $(n+1)^{th}$ frame to form a histogram curve and for comparing the histogram curve with a threshold curve;
an image correction circuit portion for performing correction for narrowing a dynamic range of the image of the $(n+1)^{th}$ frame, which is read from the image data storage portion; and
an output switching switch portion for switching and outputting the image data corrected in the image correction circuit portion and the image data from the image data storage portion, which is not corrected, in accordance with output from the histogram comparator portion to the display device.

2. The image processing system according to claim 1, wherein electrical signals are input and output between the display device and the output switching switch portion through an interface.

3. The image processing system according to claim 1, wherein the display device, the image data storage portion, the histogram conversion portion, the histogram comparator portion, the image correction circuit portion, and the output switching switch portion are provided over the same substrate.

4. The image processing system according to claim 1, wherein the correction for narrowing the dynamic range of the image of the $(n+1)^{th}$ frame is a gamma correction or a tone curve correction.

5. The image processing system according to claim 1, wherein a transistor is used for the switching in the output switching switch portion.

6. An image processing system comprising:
a display device for displaying a moving image by using an image divided into a plurality of frames;
an image data storage portion for storing image data of an image of an $n^{th}$ (n is a natural number) frame and image data of an image of an $(n+1)^{th}$ frame;
a histogram conversion portion for calculating a histogram of the $n^{th}$ frame and a histogram of the $(n+1)^{th}$ frame in accordance with the image data stored in the image data storage portion;
an external illuminance detector for detecting illuminance;
a histogram comparator portion for calculating a difference between the histogram of the $n^{th}$ frame and the histogram of the $(n+1)^{th}$ frame to form a histogram curve and for comparing the histogram curve with a threshold curve in accordance with output from the external illuminance detector;
an image correction circuit portion for performing correction for narrowing a dynamic range of the image of the $(n+1)^{th}$ frame, which is read from the image data storage portion; and
an output switching switch portion for switching and outputting the image data corrected in the image correction circuit portion and the image data from the image data storage portion, which is not corrected, in accordance with output from the histogram comparator portion to the display device.

7. The image processing system according to claim 6, wherein electrical signals are input and output between the display device and the output switching switch portion through an interface.

8. The image processing system according to claim 6, wherein the display device, the image data storage portion, the histogram conversion portion, the histogram comparator portion, the image correction circuit portion, and the output switching switch portion are provided over the same substrate.

9. The image processing system according to claim 6, wherein the correction for narrowing the dynamic range of the image of the $(n+1)^{th}$ frame is a gamma correction or a tone curve correction.

10. The image processing system according to claim 6, wherein a transistor is used for the switching in the output switching switch portion.

11. A method of image processing comprising the steps of:
dividing a moving image into a plurality of frames;
storing image data of an image of an $n^{th}$ (n is a natural number) frame and image data of an image of an $(n+1)^{th}$ frame in an image data storage portion;
calculating a histogram of the $n^{th}$ frame and a histogram of the $(n+1)^{th}$ frame in a histogram conversion portion in accordance with the image data stored in the image data storage portion;
calculating a difference between the histogram of the $n^{th}$ frame and the histogram of the $(n+1)^{th}$ frame in a histogram comparator portion to form a histogram curve;
comparing the histogram curve with a threshold curve;
performing correction for narrowing a dynamic range of the image of the $(n+1)^{th}$ frame, which is read from the image data storage portion, in an image correction circuit portion, and
switching and outputting the image data corrected in the image correction circuit portion and the image data from the image data storage portion, which is not corrected, in an output switching switch portion, in accordance with output from the histogram comparator portion to a display device.

12. The method of image processing according to claim 11, wherein the correction for narrowing the dynamic range of the image of the $(n+1)^{th}$ frame is a gamma correction or a tone curve correction.

13. The method of image processing according to claim 11, wherein the switching and outputting the image data are performed in a retrace interval from a period at which the image data of the $(n+1)^{th}$ frame is input to the image data storage portion to a period at which the image data of an $(n+2)^{th}$ frame is input to the image data storage portion.

14. A method of image processing comprising the steps of:
dividing a moving image into a plurality of frames;
storing image data of an image of an $n^{th}$ (n is a natural number) frame and image data of an image of an $(n+1)^{th}$ frame in an image data storage portion;
calculating a histogram of the $n^{th}$ frame and a histogram of the $(n+1)^{th}$ frame in a histogram conversion portion in accordance with the image data stored in the image data storage portion;
detecting illuminance in an external illuminance detector;
calculating a difference between the histogram of the $n^{th}$ frame and the histogram of the $(n+1)^{th}$ frame in a histogram comparator portion to form a histogram curve;
comparing the histogram curve with a threshold curve in accordance output from the external illuminance detector;
performing correction for narrowing a dynamic range of the image in the $(n+1)^{th}$ frame, which is read from the image data storage portion, in an image correction circuit portion, and
switching and outputting the image data corrected in the image correction circuit portion and the image data from the image data storage portion, which is not corrected, in an output switching switch portion, in accordance with output from the histogram comparator portion to a display device.

15. The method of image processing according to claim 14, wherein the correction for narrowing the dynamic range of the image of the $(n+1)^{th}$ frame is a gamma correction or a tone curve correction.

16. The method of image processing according to claim 14, wherein the switching and outputting the image data are performed in a retrace interval from a period at which the image data of the $(n+1)^{th}$ frame is input to the image data storage portion to a period at which the image data of an $(n+2)^{th}$ frame is input to the image data storage portion.

* * * * *

UNITED STATES PATENT AND TRADEMARK OFFICE
CERTIFICATE OF CORRECTION

| | | |
|---|---|---|
| PATENT NO. | : 8,483,506 B2 | Page 1 of 1 |
| APPLICATION NO. | : 12/489479 | |
| DATED | : July 9, 2013 | |
| INVENTOR(S) | : Dembo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this
Twenty-seventh Day of January, 2015

Michelle K. Lee
*Deputy Director of the United States Patent and Trademark Office*